United States Patent
Asenjo et al.

(10) Patent No.: US 9,825,949 B2
(45) Date of Patent: Nov. 21, 2017

(54) DEVICE AUTHENTICATION TO FACILITATE SECURE CLOUD MANAGEMENT OF INDUSTRIAL DATA

(71) Applicant: Rockwell Automation Technologies, Inc., Mayfield Heights, OH (US)

(72) Inventors: Juan L. Asenjo, Timberlake, OH (US); Francisco Maturana, Lyndhurst, OH (US)

(73) Assignee: ROCKWELL AUTOMATION TECHNOLOGIES, INC., Mayfield Heights, OH (US)

(*) Notice: Subject to any disclaimer, the term of this patent is extended or adjusted under 35 U.S.C. 154(b) by 66 days.

(21) Appl. No.: 14/634,174

(22) Filed: Feb. 27, 2015

(65) Prior Publication Data
US 2015/0281233 A1 Oct. 1, 2015

Related U.S. Application Data

(60) Provisional application No. 61/970,798, filed on Mar. 26, 2014.

(51) Int. Cl.
*H04L 29/06* (2006.01)
*G06F 9/50* (2006.01)
(Continued)

(52) U.S. Cl.
CPC ........ *H04L 63/0876* (2013.01); *G06F 9/5072* (2013.01); *G06F 21/44* (2013.01); *H04L 63/068* (2013.01); *H04L 67/1097* (2013.01)

(58) Field of Classification Search
CPC .................................................... H04L 63/876
(Continued)

(56) References Cited

U.S. PATENT DOCUMENTS 5,519,605 A   5/1996  Cawlfield
6,230,010 B1  5/2001  Morris
(Continued)

FOREIGN PATENT DOCUMENTS

CN   1755564   4/2006
CN   1937559   3/2007
(Continued)

OTHER PUBLICATIONS

Office Action for U.S. Appl. No. 14/525,131, dated Jun. 28, 2016, 36 pages.
(Continued)

*Primary Examiner* — Jacob Lipman
(74) *Attorney, Agent, or Firm* — Amin, Turocy & Watson, LLP

(57) ABSTRACT

Authentication of cloud agents that collect and/or process industrial data facilitates secure communications with a cloud platform. An authentication component receives an authentication request from a cloud agent device residing at an industrial facility. The authentication component also authenticate the cloud agent device in response to the authentication request for a defined period of time based on an access key that uniquely identifies the cloud agent device residing at the industrial facility. A cloud data processing component receives, at a cloud platform, one or more data packets from the cloud agent device during the defined period of time and processes industrial data contained in the one or more data packets according processing instructions associated with the cloud platform.

20 Claims, 17 Drawing Sheets

(51) Int. Cl.
G06F 21/44 (2013.01)
H04L 29/08 (2006.01)
(58) Field of Classification Search
USPC .................................................. 726/7
See application file for complete search history.

(56) References Cited

U.S. PATENT DOCUMENTS

| | | | |
|---|---|---|---|
| 6,609,034 | B1 | 8/2003 | Behrens et al. |
| 6,640,241 | B1 | 10/2003 | Ozzie et al. |
| 6,675,226 | B1 | 1/2004 | Nair et al. |
| 7,133,908 | B1 | 11/2006 | Pajak et al. |
| 7,159,209 | B1 | 1/2007 | Srinivasan et al. |
| RE39,989 | E | 1/2008 | Morris |
| 7,676,287 | B2 | 3/2010 | Eryurek et al. |
| 8,219,216 | B2 | 7/2012 | Klug et al. |
| 8,275,847 | B2 | 9/2012 | Lewis |
| 2003/0014387 | A1 | 1/2003 | Kreidler et al. |
| 2003/0083754 | A1 | 5/2003 | Tripathi et al. |
| 2003/0212818 | A1 | 11/2003 | Klein et al. |
| 2004/0141517 | A1 | 7/2004 | Balasubramanian et al. |
| 2004/0230859 | A1 | 11/2004 | Cochran et al. |
| 2005/0010333 | A1 | 1/2005 | Lorton et al. |
| 2005/0154477 | A1 | 7/2005 | Martin et al. |
| 2005/0193285 | A1 | 9/2005 | Jeon |
| 2006/0068762 | A1 | 3/2006 | Baldwin et al. |
| 2006/0294047 | A1 | 12/2006 | Johnston et al. |
| 2007/0019641 | A1 | 1/2007 | Pai et al. |
| 2008/0168092 | A1 | 7/2008 | Boggs et al. |
| 2008/0317058 | A1 | 12/2008 | Williams |
| 2009/0183201 | A1 | 7/2009 | Dasgupta |
| 2009/0198350 | A1 | 8/2009 | Thiele |
| 2009/0265036 | A1 | 10/2009 | Jamieson et al. |
| 2009/0326892 | A1 | 12/2009 | Lin |
| 2010/0070852 | A1 | 3/2010 | Li |
| 2010/0256794 | A1 | 10/2010 | McLaughlin et al. |
| 2010/0256795 | A1 | 10/2010 | McLaughlin et al. |
| 2010/0257228 | A1 | 10/2010 | Staggs et al. |
| 2011/0066298 | A1 | 3/2011 | Francino |
| 2011/0103393 | A1 | 5/2011 | Meier et al. |
| 2011/0134930 | A1 | 6/2011 | McLaren et al. |
| 2011/0145836 | A1 | 6/2011 | Wheeler et al. |
| 2012/0143378 | A1 | 6/2012 | Spears et al. |
| 2012/0166963 | A1 | 6/2012 | Kohli et al. |
| 2012/0232869 | A1 | 9/2012 | Maturana et al. |
| 2012/0331104 | A1 | 12/2012 | Akiyama et al. |
| 2013/0067090 | A1 | 3/2013 | Batrouni et al. |
| 2013/0081146 | A1 | 3/2013 | Hakozaki |
| 2013/0110298 | A1 | 5/2013 | Beveridge |
| 2013/0123965 | A1 | 5/2013 | Cooper et al. |
| 2013/0124253 | A1 | 5/2013 | Cooper et al. |
| 2013/0150986 | A1 | 6/2013 | Timsjo et al. |
| 2013/0191106 | A1 | 7/2013 | Kephart et al. |
| 2013/0211559 | A1 | 8/2013 | Lawson et al. |
| 2013/0211870 | A1 | 8/2013 | Lawson et al. |
| 2013/0212420 | A1 | 8/2013 | Lawson et al. |
| 2013/0225151 | A1 | 8/2013 | King et al. |
| 2013/0227446 | A1 | 8/2013 | Zala et al. |
| 2013/0262678 | A1 | 10/2013 | Tung et al. |
| 2013/0266193 | A1 | 10/2013 | Tiwari et al. |
| 2013/0269020 | A1* | 10/2013 | Griffin ................ H04L 63/0884 726/9 |
| 2013/0283151 | A1 | 10/2013 | Deguzman et al. |
| 2013/0290952 | A1 | 10/2013 | Childers, Jr. |
| 2014/0047107 | A1* | 2/2014 | Maturana ................ H04L 43/04 709/224 |
| 2014/0147064 | A1 | 2/2014 | Maturana et al. |
| 2014/0115592 | A1 | 4/2014 | Frean et al. |
| 2014/0156234 | A1 | 6/2014 | Maturana et al. |
| 2014/0164124 | A1 | 6/2014 | Rhoads |
| 2014/0207868 | A1 | 7/2014 | Gordon et al. |
| 2014/0257528 | A1 | 9/2014 | Perez et al. |
| 2014/0269531 | A1 | 9/2014 | Luna et al. |
| 2014/0274005 | A1 | 9/2014 | Luna et al. |
| 2014/0280796 | A1 | 9/2014 | Pijewski |
| 2014/0282015 | A1 | 9/2014 | Nixon et al. |
| 2014/0337473 | A1 | 11/2014 | Frusina et al. |
| 2015/0220080 | A1 | 8/2015 | Nixon et al. |

FOREIGN PATENT DOCUMENTS

| | | |
|---|---|---|
| CN | 103293953 | 9/2013 |
| CN | 203466840 | 3/2014 |
| CN | 103701953 A | 4/2014 |
| EP | 1422619 | 5/2004 |
| EP | 2228965 | 9/2010 |
| EP | 2541354 | 1/2013 |
| EP | 2592812 | 5/2013 |
| EP | 2660667 | 11/2013 |
| EP | 2704401 | 3/2014 |

OTHER PUBLICATIONS

Office Action for U.S. Appl. No. 14/665,128, dated Jul. 20, 2016, 9 pages.
Office Action from U.S. Appl. No. 14/525,144, dated Sep. 9, 2016, 28 pages.
Extended European Search Report for EP Application Serial No. 15160984.9, dated Jul. 4, 2016, 10 pages.
European Office Action for EP Application Serial No. 15160984.9, dated Aug. 8, 2016, 2 pages.
Extended European Search Report for EP Application Serial No. 15160944.3, dated Jul. 8, 2016, 9 pages.
European Office Action for EP Application Serial No. 15160944.3, dated Aug. 16, 2016, 2 pages.
Extended European Search Report for EP Application Serial No. 15160868.4, dated Jun. 29, 2016, 11 pages.
European Office Action for EP Application Serial No. 15160868.4, dated Aug. 1, 2016, 2 pages.
Extended European Search Report for EP Application Serial No. 15160980.7, dated Jul. 28, 2016, 10 pages.
Extended European Search Report for EP Application Serial No. 15160924.5, dated Jul. 14, 2016, 10 pages.
European Office Action for EP Application Serial No. 15160924.5, dated Aug. 22, 2016, 2016, 2 pages.
Extended European Search Report for EP Application Serial No. 15160941.9, dated Jul. 27, 2016, 12 pages.
Extended European Search Report for EP Application Serial No. 15160987.2, dated Jul. 11, 2016, 9 pages.
European Office Action for EP Application Serial No. 15160987.2, dated Aug. 16, 2016, 2 pages.
Steiner, J. G., et al., "Kerberos: An Authentication Service for Open Network Systems," Proceedings of the Winter Usenix Conference, Feb. 9, 1988, pp. 191-202.
Extended European Search Report for EP Application Serial No. 15160989.8, dated Sep. 22, 2016, 5 pages.
Extended European Search Report for EP Application Serial No. 15160988.0, dated Sep. 16, 2016, 9 pages.
European Office Action for EP Application Serial No. 15160941.9, dated Aug. 29, 2016, 2 pages.
European Office Action for EP Application Serial No. 15160980.7, dated Sep. 5, 2016, 2 pages.
Office Action for U.S. Appl. No. 14/525,131, dated Oct. 4, 2016, 56 pages.
European Office Action for EP Application Serial No. 15160988.0, dated Oct. 24, 2016, 2 pages.
Office Action for U.S. Appl. No. 14/562,233, dated Jan. 25, 2017, 25 pages.
Office Action for U.S. Appl. No. 14/639,279, dated Feb. 10, 2017, 110 pages.
Office Action for U.S. Appl. No. 14/525,131, dated Feb. 3, 2017, 21 pages.
Office Action for U.S. Appl. No. 14/525,144, dated Feb. 3, 2017, 42 pages.
Office Action for U.S. Appl. No. 14/525,149, dated Feb. 27, 2017, 76 pages.
Office Action for Chinese Application No. 201510136419.4, dated Apr. 21, 2017, 10 pages.

(56) References Cited

OTHER PUBLICATIONS

Office Action for Chinese Application No. 201510135130.0, dated May 3, 2017, 15 pages.
Office Action for U.S. Appl. No. 14/478,974, dated Jun. 15, 2017, 11 pages.
Office Action for U.S. Appl. No. 14/619,933 dated May 15, 2017, 11 pages.
Office Action for Chinese Application No. 201510138371.0 dated May 4, 2017, 15 pages.
Final Office Action for U.S. Appl. No. 14/525,149, dated Jul. 7, 2017, 77 pages.
Chinese Office Action for Chinese Application Serial No. 201510138210.1 dated Jul. 12, 2017, 14 pages (with English translation).
Final Office Action for U.S. Appl. No. 14/562,233, dated Jul. 28, 2017, 33 pages.
Final Office Action for U.S. Appl. No. 14/639,279, dated Aug. 9, 2017, 66 pages.

\* cited by examiner

DEVICE AUTHENTICATION TO FACILITATE SECURE CLOUD MANAGEMENT OF INDUSTRIAL DATA

CROSS-REFERENCE TO RELATED APPLICATIONS

This application claims priority to U.S. Provisional Application Ser. No. 61/970,798, filed on Mar. 26, 2014, entitled "INDUSTRIAL CLOUD INFRASTRUCTURE FOR DATA INGESTION, MODELING, PROCESSING, ANALYTICS, AND REPORTING," the entirety of which is incorporated herein by reference.

BACKGROUND

The subject matter disclosed herein relates generally to security related to industrial data collection, and, more particularly, to authentication of an on-premise cloud agent that facilitates collection and upload of industrial data to a cloud-based storage and processing infrastructure.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system includes an authentication component and a cloud data processing component. The authentication component is configured to receive an authentication request from a cloud agent device residing at an industrial facility and authenticate the cloud agent device in response to the authentication request for a defined period of time based on an access key that uniquely identifies the cloud agent device residing at the industrial facility. The cloud data processing component is configured to receive, at a cloud platform, one or more data packets from the cloud agent device during the defined period of time and process industrial data contained in the one or more data packets according processing instructions associated with the cloud platform.

Also, one or more embodiments provide a method for receiving, by a system comprising at least one processor, an authentication request from a cloud agent device associated with an industrial facility, authenticating the cloud agent device with a cloud platform in response to the authentication request for a defined interval of time based on an access key that uniquely identifies the cloud agent device associated with the industrial facility, receiving industrial data from the cloud agent device during the defined interval of time, and assigning the industrial data to a priority queue on the cloud platform.

Also, according to one or more embodiments, a non-transitory computer-readable medium is provided having stored thereon instructions that, in response to execution, cause a system to perform operations, the operations comprising receiving, at a cloud platform, an authentication request from a cloud agent device associated with an industrial facility that requests authentication with the cloud platform, authenticating the cloud agent device in response to the authentication request for a defined time period based on an access key that uniquely identifies the cloud agent device associated with the industrial facility, receiving one or more data packets from the cloud agent device during the defined time period, and processing industrial data associated with the one or more data packets according to processing instructions associated with the cloud platform.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
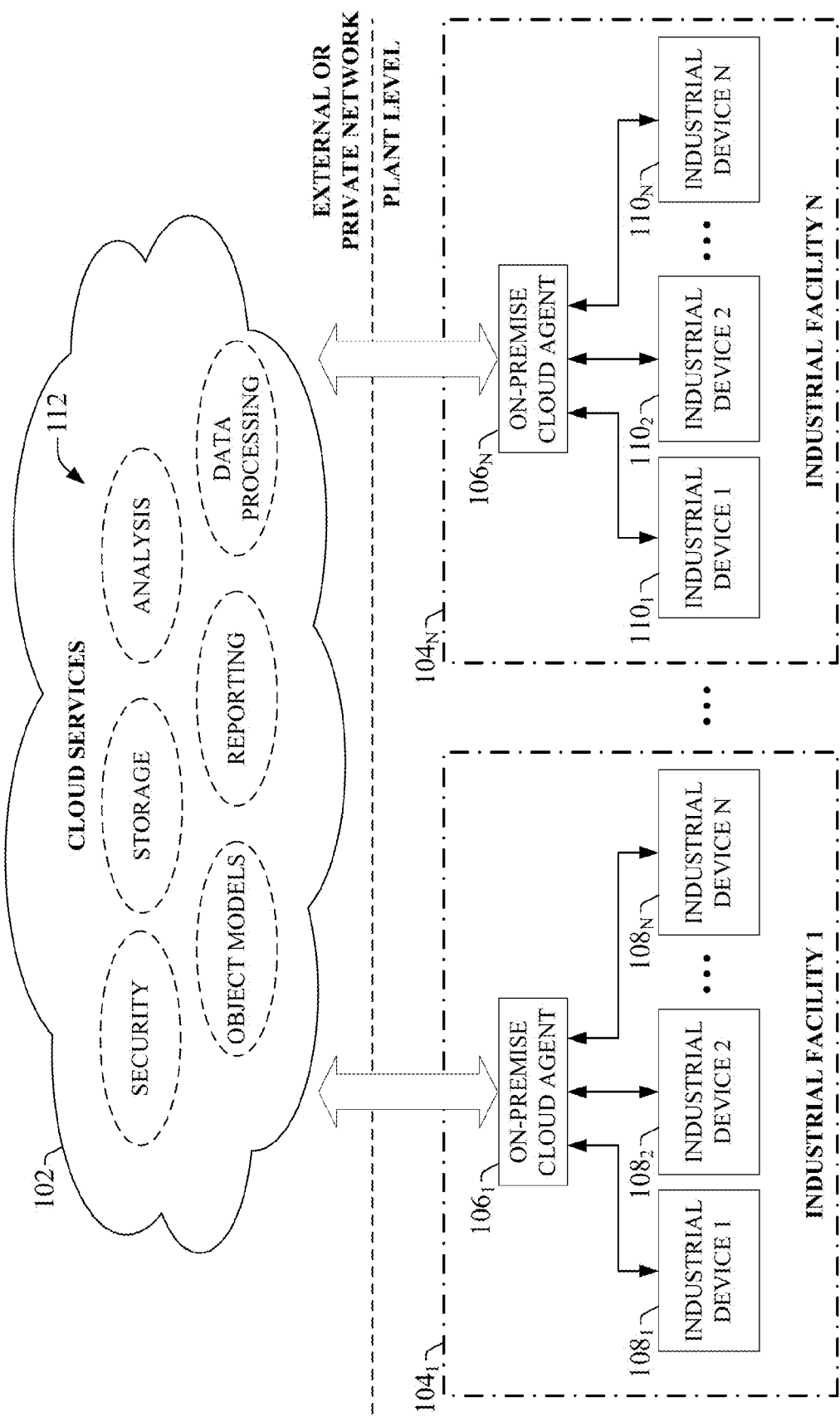
FIG. 1 is a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback (e.g., manually entered reason codes associated with a downtime condition), electrical or mechanical load over time, and the like are often monitored, and in some cases recorded, on a continuous basis. This data is generated by the many industrial devices that make up a typical automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. The amount of generated automation data further increases as additional plant facilities are added to an industrial enterprise.

The large quantity of data generated by modern automation systems makes it possible to apply a broad range of plant analytics to the automation systems and processes that make up an industrial enterprise or business. However, access to the industrial data is typically limited to applications and devices that share a common network with the industrial controllers that collect and generate the data. As such, plant personnel wishing to leverage the industrial data generated by their systems in another application (e.g., a reporting or analysis tool, notification system, visualization application, backup data storage, etc.) are required to maintain such applications on-site using local resources. Moreover, leveraging industrial data generated by an industrial enterprise or business can potentially raise security risks.

To address these and other issues, one or more embodiments of the present disclosure provide a cloud computing platform architecture with a security feature (e.g., a device authentication feature) that facilitates remote collection, storage, and/or processing of industrial data. The platform employs cloud agents to gather industrial data from data sources at all levels of an industrial enterprise, including but not limited to industrial devices (e.g., controllers, drives, telemetry devices, etc.), data historians, data tables, business-level systems (e.g. enterprise resource planning systems, manufacturing execution systems, accounting systems, etc.), and other such data source. The cloud agents can be authorized cloud agents that are authorized to communicate with the cloud computing platform. The computing platform can intelligently sort, organize and/or process the acquired data transmitted by the authorized cloud agents.

FIG. 1 illustrates a high-level overview of an industrial enterprise that leverages cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems. Industrial devices 108 and 110 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc. . . . ), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in fixed-location industrial facilities 104, the industrial devices 108 and 110 may also be part of a mobile control application, such as a system contained in a truck or other service vehicle.

According to one or more embodiments, on-premise cloud agents 106 can collect data from industrial devices 108 and 110—or from other data sources, including but not limited to data historians, business-level systems, etc.—and send this data to cloud platform 102 for processing and storage. Cloud platform 102 can be any infrastructure that allows cloud services 112 to be accessed and utilized by cloud-capable devices. Cloud platform 102 can be a public cloud accessible via the Internet by devices having Internet connectivity and appropriate authorizations to utilize the services 112. In some scenarios, cloud platform 102 can be provided by a cloud provider as a platform-as-a-service (PaaS), and the services 112 (such as the manifest system described herein) can reside and execute on the cloud platform 102 as a cloud-based service. In some such configurations, access to the cloud platform 102 and the services 112 can be provided to customers as a subscription service by an owner of the services 112. Alternatively, cloud platform 102 can be a private or semi-private cloud operated internally by the enterprise, or a shared or corporate cloud environment. An exemplary private cloud can comprise a set of servers hosting the cloud services 112 and residing on a corporate network protected by a firewall.

Each of the on-premise cloud agents 106 can be authenticated via the cloud platform 102. For example, a security feature (e.g., a cloud agent authentication feature) of the cloud platform can establish an authorized connection between each of the on-premise cloud agents 106 and the cloud platform 102. Therefore, industrial data collected by the on-premise cloud agents 106 can be securely transmitted and/or uploaded to the cloud platform 102. In an example, the cloud platform 102 can register a particular on-premise cloud agent 106. After being registered with the cloud platform 102, the particular on-premise cloud agent 106 can subsequently authenticate industrial devices associated with the particular on-premise cloud agent 106 (e.g., industrial devices 108, industrial devices 110, etc.). In an aspect, the cloud platform 102 can authenticate and/or transmit a key to facilitate connecting a particular on-premise cloud agent 106 to the cloud platform 102. The key can be valid for a defined time period (e.g., 30 minutes, 1 hour, 1 day, another time period, etc.). When a secure connection between an on-premise cloud agent 106 and the cloud platform 102 is established (e.g., when an on-premise cloud agent 106 is authenticated), the on-premise cloud agent 106 can transmit data to the cloud platform 102, receive data from the cloud platform 102 and/or utilize cloud services 112.

Cloud services 112 can include, but are not limited to, security (e.g., authentication) services, data storage, data analysis, control applications (e.g., applications that can generate and deliver control instructions to industrial devices 108 and 110 based on analysis of real-time system data or other factors), visualization applications such as the cloud-based operator interface system described herein, reporting applications, Enterprise Resource Planning (ERP) applications, notification services, or other such applications. Cloud platform 102 may also include one or more object models to facilitate data ingestion and processing in the cloud. If cloud platform 102 is a web-based cloud, cloud agents 106 at the respective industrial facilities 104 may interact with cloud services 112 directly or via the Internet. In an exemplary configuration, the industrial devices 108 and 110 connect to the on-premise cloud agents 106 through a physical or wireless local area network or radio link. In another exemplary configuration, the industrial devices 108 and 110 may access the cloud platform 102 directly using integrated cloud agents. Cloud agents and their associated data collection and processing services are discussed in more detail below. In an implementation, the cloud platform 102 can employ a service (e.g., a security service, an authorization service, a web service, etc.) that can validate a cloud agent 106 when the cloud agent 106 first connect to the cloud platform 102. The cloud platform can include a database with an identifier for the cloud agent 106 (e.g., a media access control (MAC) address) that uniquely identifies the cloud agent 106 (e.g., each cloud agent 106 can be associated with a unique identity). After being authorized by the cloud platform 102, the cloud agent can transfer data to storage associated with the cloud platform 102.

Ingestion of industrial device data in the cloud platform 102 through the use of authorized cloud agents 106 (e.g., allowing authorized clients to interact with servers on-premise and/or via the cloud) can offer a number of advantages particular to industrial automation. For one, secure communication from authorized cloud agents 106 into a cloud fabric (e.g., the cloud platform 102) can be provided. Furthermore, cloud-based storage offered by the cloud platform 102 can be secure and/or easily scaled to accommodate the large quantities of data generated daily by an industrial enterprise. Moreover, multiple industrial facilities at different geographical locations can migrate their respective automation data to the cloud for secure aggregation, collation, collective analysis, visualization, and enterprise-level reporting without the need to establish a private network between the facilities. Cloud agents 106 can be configured to automatically detect and communicate with the cloud platform 102 upon installation at any facility, simplifying integration with existing cloud-based data storage, analysis, or reporting applications used by the enterprise. In another example application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). Moreover, cloud based control applications can perform remote decision-making for a controlled industrial system based on data collected in the cloud from the industrial system, and issue control commands to the system via the cloud agent. These industrial cloud-computing applications are only intended to be exemplary, and the systems and methods described herein are not limited to these particular applications. The cloud platform 102 can allow software vendors to provide software as a service, removing the burden of software maintenance, upgrading, and backup from their customers.

Figure 2:
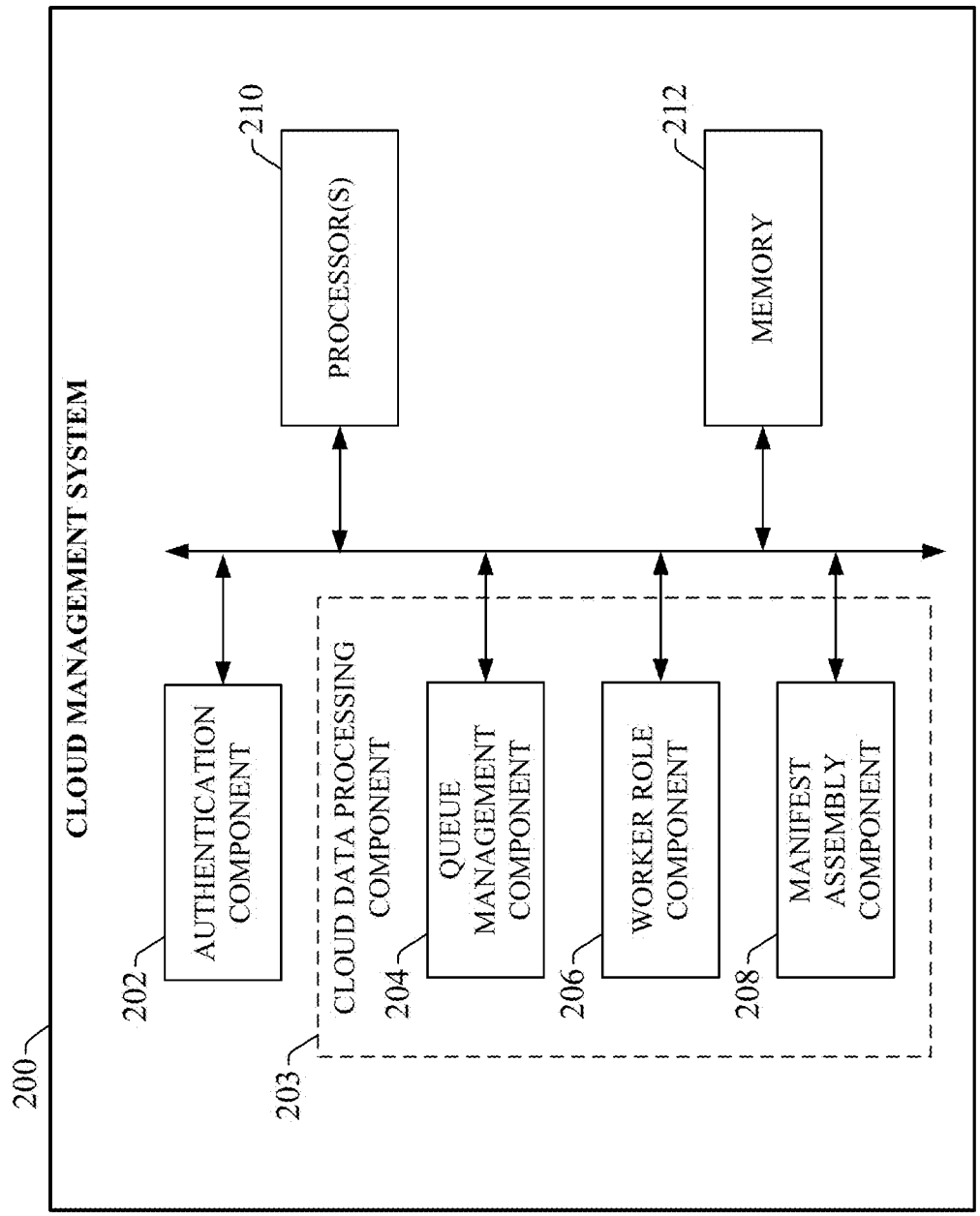
FIG. 2 is a block diagram of an example cloud management system.

FIG. 2 is a block diagram of an example cloud management system 200 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described. In one example, the cloud management system 200 can be associated with the cloud platform 102.

Cloud management system 200 can include an authentication component 202 and a cloud data processing component 203. In an aspect, the cloud data processing component 203 can include a queue management component 204, a worker role component 206 and/or a manifest assembly component 208. The cloud management system 200 can also include one or more processors 210 and memory 212. In various embodiments, one or more of the authentication component 202, the cloud data processing component 203, the queue management component 204, the worker role component 206, the manifest assembly component 208, the one or more processors 210, and the memory 212 can be electrically and/or communicatively coupled to one another to perform one or more of the functions of the cloud management system 200. In other embodiments, one or more of the authentication component 202, the cloud data processing component 203, the queue management component 204, the worker role component 206, and the manifest assembly component 208 can be implemented on separate devices (e.g., the authentication component 202 can be implemented on a first server and the cloud data processing component 203 can be implemented on a second server, etc.). In some embodiments, components 202, 203, 204, 206 and/or 208, can comprise software instructions stored on memory 212 and executed by processor(s) 210. Cloud management system 200 may also interact with other hardware and/or software components not depicted in FIG. 2. For example, processor(s) 210 may interact with one or more external user interface devices, such as a keyboard, a mouse, a display monitor, a touchscreen, or other such interface devices.

The authentication component 202 can receive an authentication request from a cloud agent device (e.g., cloud agent 106, etc.) residing at an industrial facility (e.g., industrial facility 104). Additionally, the authentication component 202 can authenticate the cloud agent device in response to the authentication request for a defined period of time based on an access key that uniquely identifies the cloud agent device residing at the industrial facility. The access key can be associated with metadata. The metadata can include device identification data associated with the cloud agent device and/or an industrial device related to the cloud agent device (e.g., a MAC address, another type of identifier, etc.). Additionally or alternatively, the metadata can include industrial facility data associated with the industrial facility (e.g., a site identifier identifying a particular industrial facility, location data, etc.). Additionally or alternatively, the metadata can include customer data associated with the cloud agent device and/or the industrial facility. However, it is to be appreciated that the metadata associated with the access key can include other data that uniquely identifies the cloud agent device residing at the industrial facility. In certain implementations, the authentication component 202 can select the access key from a set of access keys based on metadata associated with the access key (e.g., device identification data, industrial facility data, customer data, other data, etc.).

In an aspect, the authentication component 202 can authorize a cloud agent device (e.g., cloud agent 106, etc.) to utilize one or more cloud services associated with a cloud platform (e.g., cloud platform 102, etc.) based on an access key for the cloud agent device (e.g., permissions associated with the access key). For example, the authentication component 202 can authorize the cloud agent device (e.g., cloud agent 106, etc.) to utilize data storage, data analysis, control applications (e.g., applications that can generate and deliver control instructions to industrial devices 108 and 110 based on analysis of real-time system data or other factors), visualization applications such as the cloud-based operator interface system described herein, reporting applications, Enterprise Resource Planning (ERP) applications, notification services, or other such applications based on the access key. The authentication component 202 can determine, in one example, an authentication policy for the cloud agent device based on the metadata (e.g., device identification data, industrial facility data, customer data, other data, etc.) associated with the access key.

In another aspect, the authentication component 202 can pre-register the cloud agent device (e.g., cloud agent 106, etc.) with a cloud platform (e.g., cloud platform 102) during a registration mode (e.g., a cloud agent device registration mode) based on user input. For example, a user can set read permissions, write permissions and/or permissions for one or more cloud services associated with a cloud platform during the registration mode. Therefore, a user (e.g., a cloud service administrator, an owner, etc.) can define privileges to be assigned to each cloud agent device. In a non-limiting example, permissions for one or more cloud services can include permissions for a particular cloud agent device (e.g., a particular cloud agent device associated with a particular MAC address, customer identifier, site identifier and/or location identifier) to utilize a particular cloud storage location and/or cloud application. After the defined period of time has expired, the authentication component 202 can generate a different access key for the cloud agent device. For example, after the defined period of time has expired, the cloud agent device can be required to generate another authentication request and be re-authenticated with the cloud platform.

An access key for an authorized cloud agent device can be employed to encrypt data transmitted by the authorized cloud agent device to the cloud platform. Data transmitted by the cloud platform to the authorized cloud agent device can also be encrypted using the access key. Accordingly, after a cloud agent device is authenticated, the cloud data processing component 203 can be configured to receive, at a cloud platform that authenticated the cloud agent device, one or more data packets from the cloud agent device during the defined period of time. The one or more data packets can by encrypted based on the access key for the authenticated cloud agent device. The cloud data processing component 203 can also process industrial data contained in the one or more data packets (e.g., the one or more data packets transmitted by the cloud agent device) according to processing instructions associated with the cloud platform after the cloud agent device is authenticated. In an aspect, the cloud data processing component 203 can process industrial data contained in the one or more data packets (e.g., the one or more data packets transmitted by the cloud agent device) according to write permissions for the authenticated cloud agent device, read permissions for the authenticated cloud agent device and/or permissions for one or more cloud services associated with a cloud platform.

In an embodiment, the queue management component 204 can be configured to receive, at a cloud platform, a data packet from an authorized cloud agent device and assign industrial data contained in the data packet to a priority queue in the cloud platform during the defined period of time. For example, the queue management component 204 can be configured to receive compressed data packets from one or more authorized cloud agents residing at an industrial facility and organize the industrial data contained in the packets into priority queues that respectively define how the data packets are to be processed by cloud processing services. The worker role component 206 can be configured to determine how the data in the respective queues is to be processed based on manifests stored in a customer-specific manifest assembly. Manifest assembly component 208 can be configured to create, update, and manage manifests within customer-specific manifest assemblies on the cloud platform. The manifests define and implement customer-specific capabilities, applications, and preferences for processing collected data in the cloud, and can be uploaded by a user at the plant facility through an authorized cloud agent. As such, the authentication component 202 can provide a security feature (e.g., a cloud agent authentication feature) to facilitate secure collection and/or processing of industrial data via a cloud-based storage and processing infrastructure.

The one or more processors 210 can perform one or more of the functions described herein with reference to the systems and/or methods disclosed. Memory 212 can be a computer-readable storage medium storing computer-executable instructions and/or information for performing the functions described herein with reference to the systems and/or methods disclosed.

Figure 3:
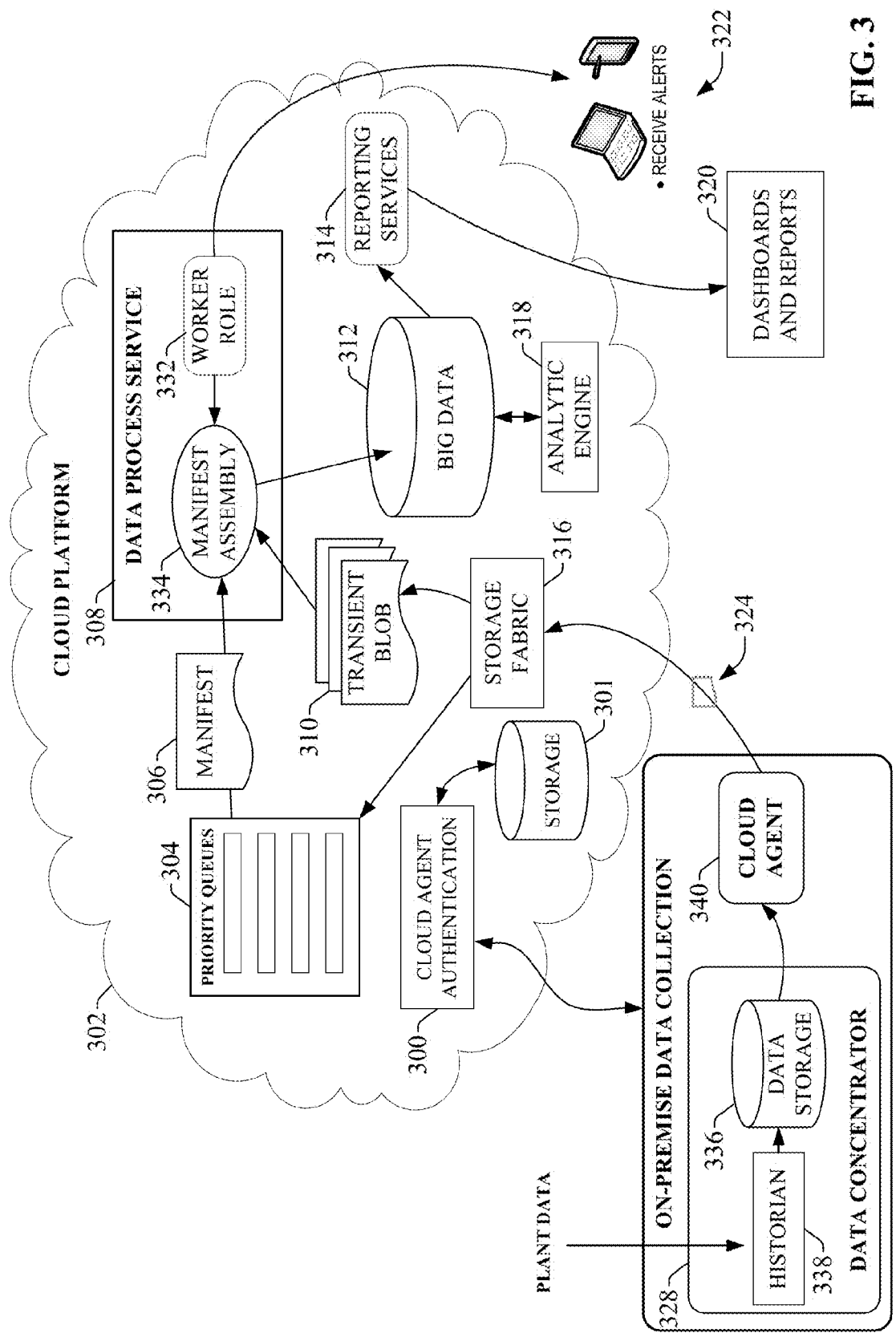
FIG. 3 is an overview of a system that leverages an agent-based cloud infrastructure to provide data collection and processing services to customer manufacturing sites.

FIG. 3 is an overview of a system that leverages an agent-based cloud infrastructure to provide secure data collection and/or processing services to customer manufacturing sites. This system can provide remote collection and monitoring services in connection with security applications, alarm and event notification for critical industrial assets, historical data collection, remote system access, system optimization, remote closed-loop control, and other such applications. The cloud-based infrastructure enables remote monitoring and reporting of on-premise assets by implementing, for example, six general areas of functionality—authorized data ingestion into the cloud, data priority, object modeling, data processing, data analytics, and reporting.

In the example illustrated in FIG. 3 a data concentrator 328 collects plant data from one or more industrial assets (e.g., data generated by one or more industrial controllers, such as industrial devices 108 or 110) at a plant facility. These industrial assets can include industrial controllers that monitor and control industrial I/O devices, data servers and historians, motor drives, remote I/O interfaces that remotely interface groups of I/O devices to one or more of the industrial controllers, boilers or other industrial machines, or other such assets. For example, data concentrator 328 can monitor one or more controller tags defined in a tag archive and store data in local data storage 336 (e.g., a local structured query language, or SQL, server) associated with a historian 338. The collected data can include historical data (e.g., alarm history, status history, trend data, etc.), live data values read from the industrial assets, alarm data generated by the industrial assets, or other types of data.

An on-premise cloud agent 340 is configured to collect the live or historical data from the industrial assets, either directly or by accessing data storage 336 associated with data concentrator 228. Cloud agent 340 can execute on any suitable hardware platform (e.g., a server, a LINUX box, etc.), and acts as a generic gateway that collects data items from the various industrial assets on the plant network and packages the collected data according to a generic, uniform data packaging schema used to move the on-premise data to a cloud platform 302. During data collection, the cloud agent 340 can intelligently sort and organize the data based on defined criteria, including but not limited to time of occurrence and/or user-defined priorities.

The data (e.g., on-premise data) can be transmitted to the cloud platform 302 by the cloud agent 340 after the cloud agent 340 is authenticated by the cloud platform 302. The cloud platform 302 can be associated with the cloud management system 200. In an aspect, the cloud platform 302 can include cloud agent authentication 300. For example, the cloud agent authentication 300 can be associated with the authentication component 202. The cloud agent authentication 300 can receive an authentication request from the cloud agent 340. In response to the authentication request, the cloud agent authentication 300 can authenticate the cloud agent 340 for a defined period of time based on an access key (e.g., metadata associated with the access key) that uniquely identifies the cloud agent 340. In one example, metadata associated with the access key can be stored in storage 301. The storage 301 can be, for example, a structure query language (SQL) database. The metadata can be associated with the cloud agent 340 and/or an industrial facility associated with the cloud agent 340. In a non-limiting example, the metadata can include a MAC address associated with the cloud agent 340 (e.g., a computing device that includes the cloud agent 340) that uniquely identifies the cloud agent 340. The cloud agent authentication 300 can select the access key from a set of access keys based on the metadata associated with the cloud agent 340 and/or an industrial facility associated with the cloud agent 340.

After being authenticated by the cloud agent authentication 300, the cloud agent 340 can be authorized (e.g., permitted) to communicate with the cloud platform via the storage fabric 316 and/or services directly and/or indirectly coupled to the storage fabric 316. For example, after being authenticated by the cloud agent authentication 300, the cloud agent 340 can periodically transmit serialized and compressed data into the cloud domain using standard web services over HTTPS/SSL. Data transmitted by the cloud agent 340 to the cloud platform 302 (e.g., storage fabric 316) can be encrypted using the access key associated with the cloud agent 340. Accordingly, secure communication channels between the cloud agent 340 and the cloud platform 302 can be managed by the cloud agent authentication 300 in the cloud.

FIG. 3 depicts data concentrator 328 as the data source for cloud agent 340. This configuration can be useful if there are a large number of data points to monitor, since the data concentrator can 328 can link multiple industrial devices or other data sources to a single cloud agent 340. However, some embodiments of cloud agent 340 can collect data directly from the industrial assets themselves; e.g., through a common industrial protocol link, or through middleware applications such as OPC clients.

Figure 4:
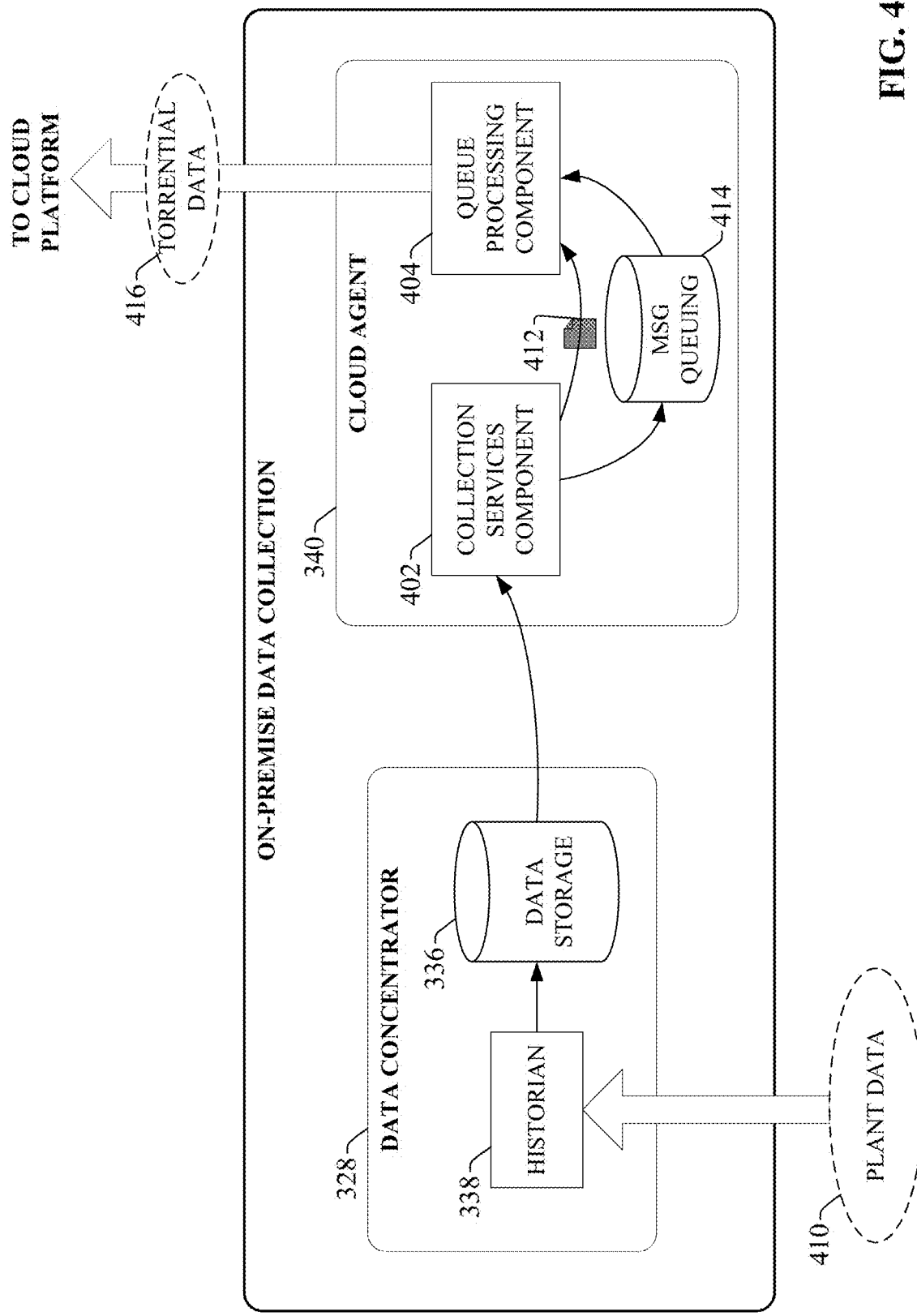
FIG. 4 is a block diagram illustrating on-premise data collection.

Cloud agent functionality is illustrated in more detail with reference to FIG. 4. On-premise data collection is enabled by a collection of services that function as a virtual support engineer for processing data. Data concentrator 328 and cloud agent 340 respectively implement two main functions associated with data collection—data concentration using a historian 338 and associated data storage 336 (e.g., an SQL server), and cloud data enablement using cloud agent services executed by cloud agent 340. As noted above, plant data 410 is collected by data concentrator 328 at the plant facility. In an example scenario, plant data 410 may comprise stamping press time series sensor data, made up of thousands of data points updated at a rate of less than a second.

Collection services component 402 of cloud agent 340 implements collection services that collect device data, either from data concentrator's associated data storage (e.g., via an SQL query) or directly from the devices themselves via a common industrial protocol (CIP) link or other suitable communication protocol. For example, to obtain data from data concentrator 328, collection services component 402 may periodically run a data extraction query (e.g., an SQL query) to extract data from data storage 336 associated with data concentrator 328. Collection services component 402 can then compress the data and store the data in a compressed data file 412. In an aspect, the compressed data file 412 can be generated based on an access key associated with the cloud agent 340. For example, data of the compressed data file 412 can be encrypted based on the access key.

Queue processing services executed by queue processing component 404 can then read the compressed data file 412 and reference a message queuing database 414, which maintains and manage customer-specific data collection configuration information, as well as information relating to the customer's subscription to the cloud platform and associated cloud services. Based on configuration information in the message queuing database 414, queue processing component 404 packages the compressed data file 412 into a data packet and pushes the data packet to the cloud platform. In some embodiments, the cloud agent 340 can support injecting data packets as torrential data 416.

Message queuing database 414 can include site-specific information identifying the data items to be collected (e.g., data tag identifiers), user-defined processing priorities for the data tags, firewall settings that allow cloud agent 340 to communicate with the cloud platform through a plant firewall, and other such configuration information. Configuration information in message queuing database 414 instructs cloud agent 340 how to communicate with the identified data tags and with the remote data collection services on the cloud platform.

In addition to collection and migration of data, one or more embodiments of cloud agent 340 can also perform local analytics on the data prior to moving the data to the cloud platform. This can comprise substantially any type of pre-processing or data refinement that may facilitate efficient transfer of the data to the cloud, prepare the data for enhanced analysis in the cloud, reduce the amount of cloud storage required to store the data, or other such benefits. For example, cloud agent 340 may be configured to compress the collected data using any suitable data compression algorithm prior to migrating the data to the cloud platform. This can include detection and deletion of redundant data bits, truncation of precision bits, or other suitable compression operations. In another example, cloud agent 340 may be configured to aggregate data by combining related data from multiple sources. For example, data from multiple sensors measuring related aspects of an automation system can be identified and aggregated into a single cloud upload packet by cloud agent 340. Cloud agent 340 may also encrypt sensitive data prior to upload to the cloud. In yet another example, cloud agent 340 may filter the data according to any specified filtering criterion (e.g., filtering criteria defined in a filtering profile stored on the cloud agent). For example, defined filtering criteria may specify that pressure values exceeding a defined setpoint are to be filtered out prior to uploading the pressure values to the cloud.

In some embodiments, cloud agent 340 may also transform a specified subset of the industrial data from a first format to a second format in accordance with a requirement of a cloud-based analysis application. For example, a cloud-based reporting application may require measured values in ASCII format. Accordingly, cloud agent 340 can convert a selected subset of the gathered data from floating point format to ASCII prior to pushing the data to the cloud platform for storage and processing. Converting the raw data at the industrial device before uploading to the cloud, rather than requiring this transformation to be performed on the cloud, can reduce the amount of processing load on the cloud side. Additionally, the cloud agent 340 can generate and/or employ a wrapper for industrial data (e.g., a wrapper format associated with an access key and/or metadata of an access key) that employs SSL to extend industrial data to cloud services associated with the cloud platform 302.

Cloud agent 340 may also associate metadata with selected subsets of the data prior to migration to the cloud, thereby contextualizing the data within the industrial environment. For example, cloud agent 340 can tag selected subsets of the data with a time indicator specifying a time at which the data was generated, a quality indicator, a production area indicator specifying a production area within the industrial enterprise from which the data was collected, a machine or process state indicator specifying a state of a machine or process at the time the data was generated, a personnel identifier specifying an employee on duty at the time the data was generated, or other such contextual metadata. In this way, cloud agent 340 can perform layered processing of the collected data to generate meta-level knowledge that can subsequently be leveraged by cloud-based analysis tools to facilitate enhanced analysis of the data in view of a larger plant context.

To ensure secure outbound traffic to the cloud, one or more embodiments of cloud agent 340 can support HTTPS/SSL, certificate authority enabled transmission, and/or unique identity using MAC addresses. Cloud agent 340 can also support store-and-forward capability to ensure data is not lost if the agent becomes disconnected from the cloud.

Returning now to FIG. 3, cloud agent 340 can send compressed data packet 324 to the cloud-based data collection and monitoring system on cloud platform 302 via a cloud storage fabric 316 during the defined period of time that the cloud agent 340 is authenticated by the cloud agent authentication 300. The data packet 324 conveys parameters and data (compressed and serialized) used by the cloud-side services to reconstruct the domain data structure in the cloud using auxiliary tenant-level manifests. The cloud services direct remote storage of the received data into preconditioned transient blobs 310. The cloud platform 302 can use agent reasoning and collective bargain features to determine a data storage locale.

Through the configuration interface provided by cloud agent 340, users at the plant facility can dynamically configure one or more priority queues 304 that respectively define how the data packets are processed in the cloud platform 302. For example, separate queues may be defined for alarms, live data, and historical data, allowing data to be organized according to these data types. The historical data queue can relate to time-series records, which can be accessed through an application programming interface (API) (e.g., an SQL API or other suitable API). The alarms queue can relate to abnormal situations, where the alarm data can also be accessed through the API. This alarms queue can comprise multiple queues associated with different alarm priorities, to allow for individual processing for different alarms having different levels of criticality. In some embodiments, servers, controllers, switches, etc., can be monitored using a number of protocols, and at a certain point (e.g., at the end of a monitoring cycle) alarms can be queued and cloud agent 340 can send the alarms to the cloud. Alarms can be reactive (e.g., alarms that trigger when a motor fails, when a CPU crashes, when an interlock is tripped, etc.) or proactive (e.g., a monitoring system may track consumables on a machine and generate an alarm when time to reorder, monitor cycle counts on a machine and generate an alarm when to schedule preventative maintenance, generate an alarm when temperatures fall outside defined bandwidths, send a notification when a computer's memory is 80% full, etc.).

The live data queue can relate to substantially real-time monitored data, such as current temperatures, current pressures, etc. The live data values can also be accessed through the API (e.g., a SQL API). The queues described above are not intended to be limiting, and it is to be appreciated that other types of priority queues can be defined according to the needs of the end user. For example, queues may be defined for specific devices or device types (e.g., motor drives) for uploading of device parameter and/or performance data.

In some embodiments, cloud agent 340 can allow the user to define these priority queues 304 from the on-site location and to define how data in each queue is handled. For example, the user can define, for each queue, an upload frequency, a priority level (e.g., which data queues should take processing priority over other data queues), identities of cloud partitions or databases in which data from the respective queues should be stored, and other such information. In an example scenario, the live data queue may be defined to process live data values that are to be used by a remote operator interface application to view substantially real-time data from the plant facility, while historical data queue may be used to process historian data for archival storage in a historical database on cloud storage. Accordingly, the live data queue may be assigned a higher priority relative to the historical data queue, since data in the live data queue is more time-critical than data in the historical queue.

Through cloud agent 340, users can assign priorities to respective data tags or tag groups at the customer site. These priority assignments can be stored in the message queuing database 414 of the cloud agent 340. Accordingly, when queue processing component 404 packages the collected data to be moved to the cloud platform, the collected data items can be packaged into data packets according to priority (as defined in message queuing database 414), and the respective data packet headers populated with the appropriate priority level. If access to the cloud is unavailable, data will continue to be collected by collection services component 402 and stored locally on the cloud agent in local storage associated with collections services. When communication to the cloud is restored, the stored data will be forwarded to cloud storage. Queue processing services can also encrypt and send storage account keys to the cloud platform for user verification.

Figure 5:
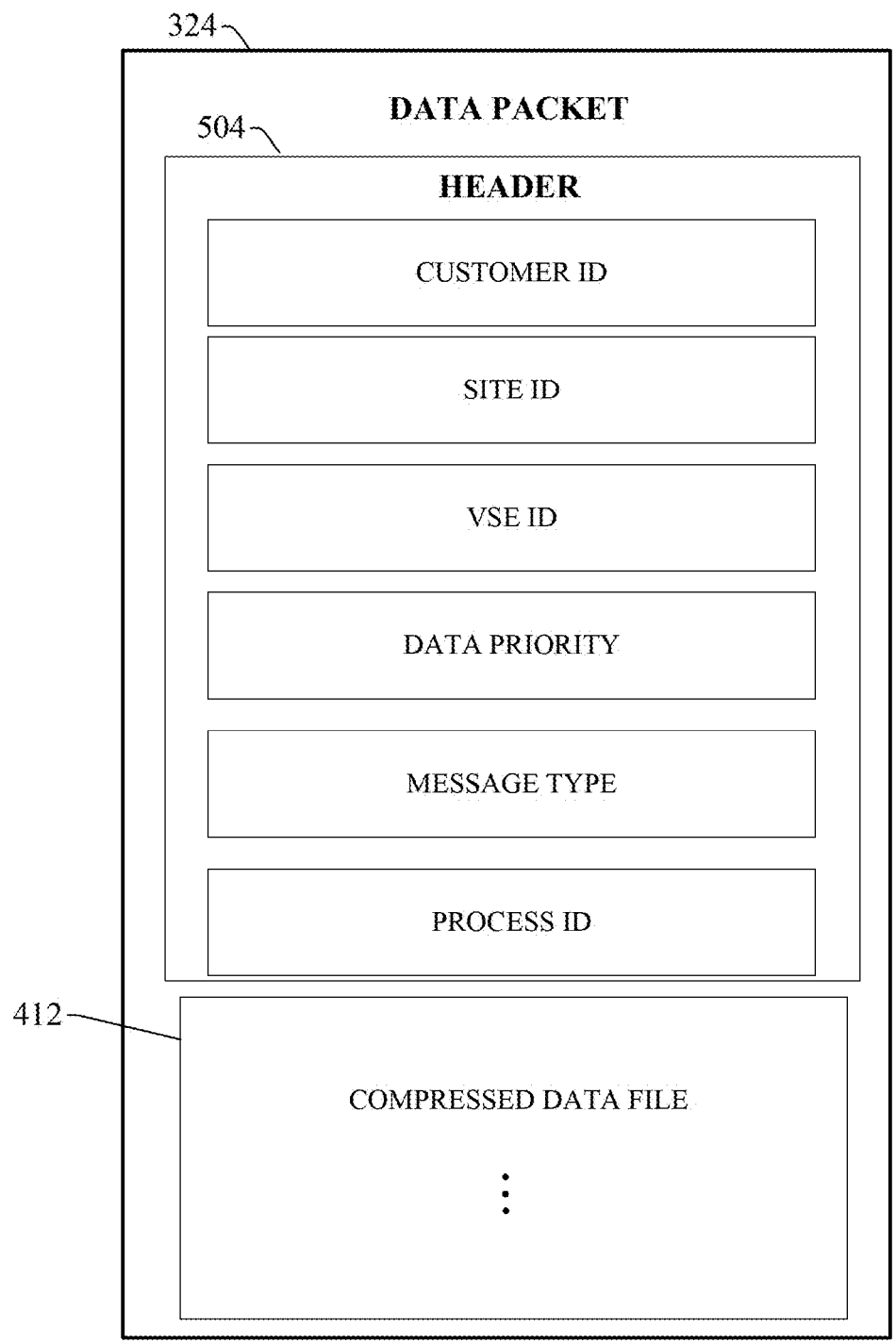
FIG. 5 is a diagram of an example compressed data packet.

Message queuing services implemented by queue processing component 404 of cloud agent 340 encapsulates or packages the compressed data file by adding customer-specific header information to yield a compressed data packed (e.g., compressed data packet 324 of FIG. 3). For example, the queue processing component 404 can access a message queuing database (e.g., message queuing database 414 of FIG. 4), which stores customer site configuration information and manages the customer's subscription to the cloud platform services. The message queuing database may include such information as a customer identifier associated with the customer entity associated with the industrial enterprise, a site identifier associated with a particular plant facility from which the data was collected, a priority to be assigned to the data (which may be dependent on the type of information being sent; e.g., alarm data, historical data, live operational data, etc.), information required to facilitate connection to the customer's particular cloud fabric, or other such information. The information included in the header is based on this customer-specific information maintained in the message queuing database. An example compressed data packet is illustrated in FIG. 5. As shown, the cloud agent's message queuing services add a header 504 to compressed data file 412 to yield the compressed data packet 324. The header 504 contains customer-specific data read from message queuing database 414. For example, header 504 can include a unique customer identifier, a site identifier representing a particular plant facility, a virtual support engineer identifier, a data priority for the data in the compressed data file 412, a message type, and a process identifier that specifies a particular manifest application on the cloud platform that should be used to process the data on the cloud side. In an aspect, the compressed data packet 324 can be generated based on an access key for a cloud agent 340 associated with the compressed data packet 324. In another aspect, information associated with the header 504 can be related to an access key for a cloud agent 340 that generated the compressed data packet 324. Packaging the data in this way can allow data from diverse data sources to be packaged together using a uniform, generic data packaging schema so that the data can be moved to the cloud infrastructure When cloud agent 340 sends a data packet to the cloud-based remote processing service, the service reads the packet's header information to determine a priority assigned to the data (e.g., as defined in a data priority field of the data packet) and sends the data packet (or the compressed data therein) to a selected one of the user defined priority queues 304 based on the priority. On the other side of the priority queues 304, a data process service 308 processes data in the respective priority queues 304 according to the predefined processing definitions. The data processing service includes a worker role 332 that determines how the queued data is to be processed based on manifests (e.g., system manifests, tag manifests, and metric manifests) stored in a customer-specific manifest assembly 334. Manifests define and implement customer-specific capabilities, applications, and preferences for processing collected data in the cloud. Manifests can be dynamically uploaded by a user at the plant facility through cloud agent 340, which facilitates dynamic extension of cloud computing capability.

For example, if new data points are to be added to the data collection system that require creation of a new data queue, the user can interact with cloud agent 340 to configure a new manifest for the new queue, the manifest defining such aspects as processing priority for the data, upload frequency for the data, where the data is to be routed or stored within cloud storage, and other such information. Cloud agent 340 can then upload the new manifest 306 together with the data (or independently of the data). The new manifest 306 is then added to the customer's manifest assembly 334 with the other manifests defined for the customer, so that worker role 332 can leverage the new manifest 306 to determine how data in the new queue is to be processed. This new manifest 306 need only be uploaded to the cloud-based remote monitoring service once. Thereafter, data placed in the new priority queue will be processed by worker role 332 according to the new manifest 306 stored in the customer's manifest assembly 334. For example, the manifest may define where the data is to be stored within cloud storage (e.g., in a historical database, and Alarms and Live Data database, big data storage 312, etc.), and whether processing of the new data queue is to take priority over other data queues. In some embodiments, the manifest assembly 334 may only accept a new manifest if the manifest is accompanied by a unique key associated with the client.

Once the cloud-based infrastructure has processed and stored the data provided by an authorized cloud agent 340 according to the techniques described above, the data can be made accessible to client devices 322 for viewing. Data analysis on the cloud platform 302 can provide a set of web-based and browser enabled technologies for retrieving, directing, and uncompressing the data from the cloud platform 302 to the client devices 322. To this end, reporting services 314 can deliver data in cloud storage (e.g., from the big data storage 312) to the client devices 322 in a defined format. For example, reporting services 314 can leverage collected data stored in the cloud repository to provide remote operator interfaces to client devices 322 over the Internet. An analytic engine 318 executing on the cloud platform 302 can also perform various types of analysis on the data stored in big data storage 312 and provide results to client devices 322.

Figure 6:
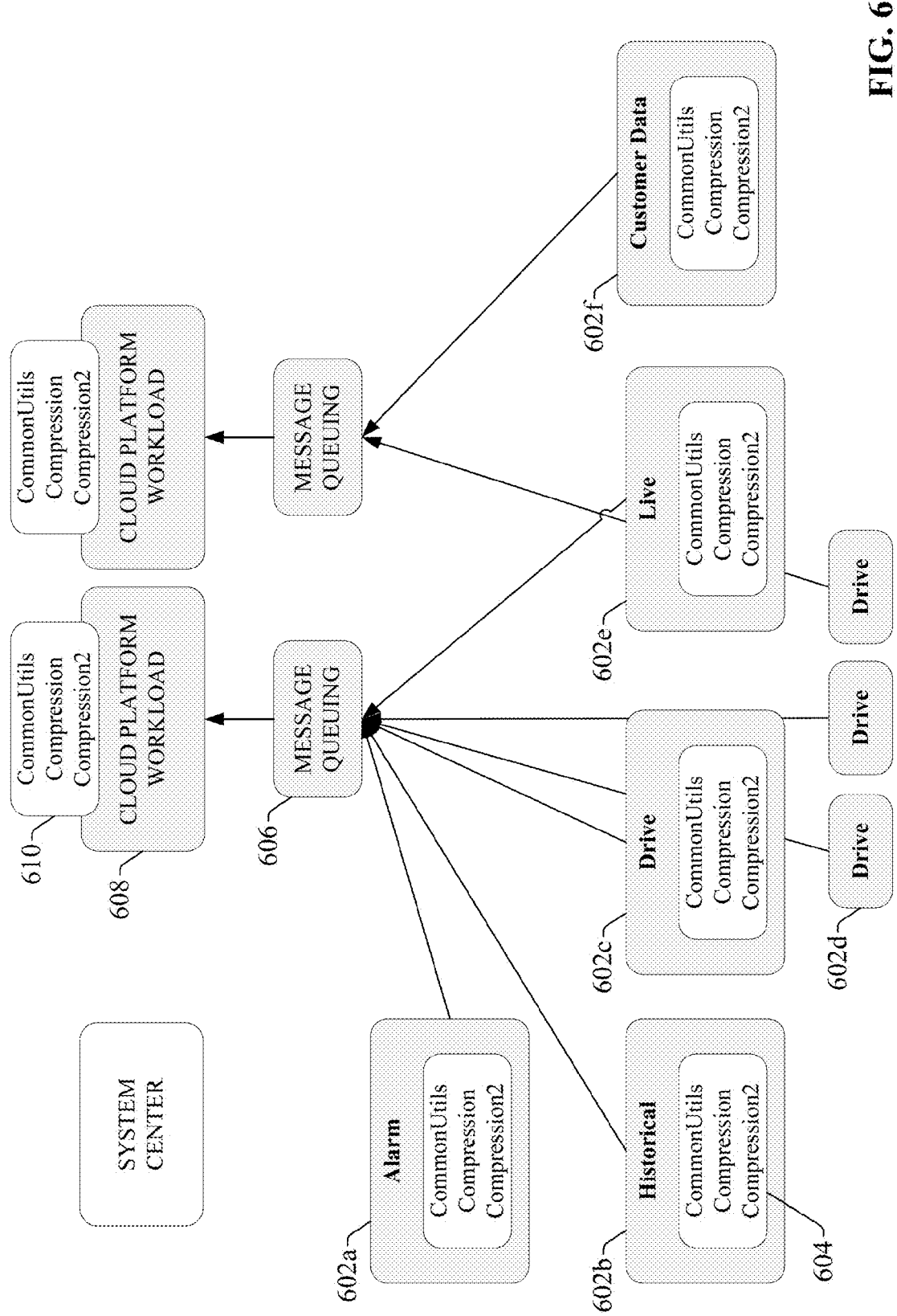
FIG. 6 is a block diagram illustrating an example agent architecture for collection of data from on-premise industrial devices.

FIG. 6 is a block diagram illustrating an example agent architecture for collection of data from on-premise industrial devices according to one or more embodiments. In this example, data is collected from a number of devices and applications 602 at the customer site, including an alarm database 602a, data historian 602b, motor drives 602c and 602d, live data server 602e, and a customer database 602f. Although these data sources comprise a diverse, heterogeneous collection of devices and applications, collection and pre-processing of data from these sources can be carried out by generic services 604 (e.g., service libraries). Generic services 604 can include utilities for identifying the data locations (e.g., devices, applications, tags, registers, etc.) from which data is to be retrieved, utilities for compressing or otherwise pre-processing the data, and providing the data to the message queuing layers 606 of the cloud agents. The workload services 608 of the cloud agents can also utilize generic services 610 to encapsulate and send the data to the cloud fabric. In an aspect, data sent to the cloud fabric can be encapsulated based on an access key for a cloud agent and/or information associated with an access key for a cloud agent. The message queuing layers 606 and workload services 608 make up the backbone of the decoupled agent architecture.

Since the cloud agent 340 encapsulates the on-premise data collected from data collection applications into envelopes containing customer-specific and application-specific information, the compressed data packets convey the parameters and data required by the cloud to identify the appropriate manifest stored in the customer's manifest assembly (e.g., manifest assembly 334) for handling, processing, and/or routing of the data contained in the compressed data file.

Figure 7:
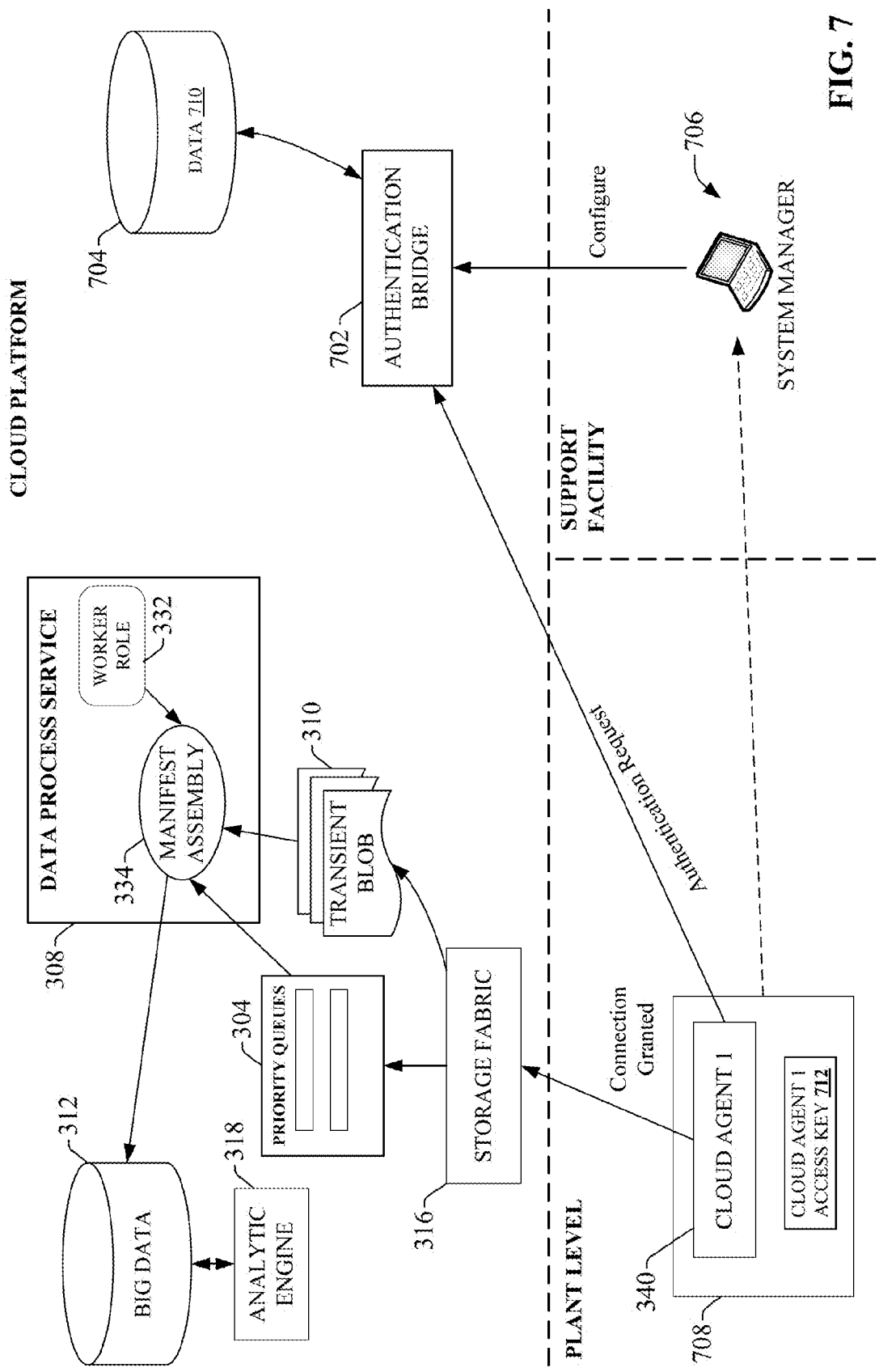
FIG. 7 is a block diagram of an example architecture that utilizes an authentication bridge to manage agent communication to a customer's cloud platform.

FIG. 7 is a block diagram of an example architecture that utilizes an authentication feature (e.g., security feature) to manage agent communication to a customer's cloud platform. In this example, an authentication bridge 702 resides on a cloud platform. The authentication bridge 702 can be associated with the authentication component 202 and/or the cloud agent authentication 300. The authentication bridge 702 may be managed by a service provider that offers a customer use of the cloud platform as a PaaS (platform as a service). The authentication bridge 702 can enforce secure access to the cloud platform and ensure that the customer's collected data in the cloud platform is only accessed by authenticated devices and users. When a new customer cloud platform is established as part of a PaaS agreement, the new customer cloud platform can be subscribed to the authentication bridge 702 so that agent communication with the new cloud platform can be regulated by the authentication bridge 702.

Cloud agent 340 may be one of several cloud agents distributed throughout a customer's industrial enterprise. In the example depicted in FIG. 7, cloud agent 340 is identified as Cloud Agent 1 to distinguish the agent from other on-premise agents. Cloud agent 340 executes on computing device 708, which may be a server, a LINUX box, or other hardware platform. Computing device 708 can be associated with metadata and/or an access key. For example, computing device 708 can be associated with a physical address (e.g., a MAC address or other physical address) that uniquely identifies the computing device 708. Additionally, the computing device 708 can be associated with industrial facility data associated with the industrial facility (e.g., a site identifier identifying a particular industrial facility, location data, etc.), customer data associated with the computing device 708 and/or other data associated with the computing device 708.

Authentication bridge 702 can store information associated with the cloud agent 340 and/or the computing device 708. Information associated with the cloud agent 340 and/or the computing device 708 may be entered into the authentication bridge 702 by a system manager 706 at a support facility associated with the cloud service provider. System manager 706 may also enter other configuration parameters that will be used by the authentication bridge 702 to manage secure connections to the customer's cloud platform. Data 710 associated with the Cloud Agent 1 and/or the computing device 708 can be stored in the storage 704. Data 710 can include configuration information for managing the agent's connectivity to the cloud platform. Data 710 can also include metadata associated with the Cloud Agent 1 and/or the computing device 708. An access key 712 associated with the Cloud Agent 1 can be stored on the computing device 708 and/or the cloud agent 340. The access key 712 can be a key that authorizes the Cloud Agent 1 to access and/or utilize the big data storage 312, the data process service 308, priority queues 304, the analytic engine 318 and/or other services associated with the cloud platform. In an aspect, the access key 712 can be associated with the data 710.

A cloud agent 340 can transmit an authentication request to the authentication bridge 702 to request a secure connection to the storage fabric 316 (e.g., to request creation of a cloud connector port that will serve as a secure communication channel between the cloud agent 340 and the cloud platform). The authentication request can include, for example, an identification of Cloud Agent 1, a physical address of computing device 708, a plant facility identifier, an identification of the particular customer-specific cloud platform to which the connection is requested and/or other information associated with the cloud agent 340 and/or the computing device 708. In response to the authentication request, the authentication bridge can authenticate the cloud agent device for a defined period of time based on the data 710. Furthermore, in response to the authentication request, the authentication bridge can transmit the access key 712 to the computing device 708. The access key 712 can be valid for the defined period of time so that the cloud agent 340 can be granted a secure connection to the storage fabric 316 during the define period of time. For example, when the cloud agent 340 is authenticated by the authentication bridge 702, by the authentication bridge 702 grants the access key 712 to the cloud agent 340 permitting the cloud agent 340 to open a temporary communication channel to the customer cloud platform. Accordingly, a cloud API managed by workload service 514 (e.g., a REST API) establishes a communication channel to the cloud platform and sends the compressed data file to the cloud platform for storage and processing as described above in connection with FIG. 3. In one or more embodiments, the workload service assigns an expiration time to the communication channel when the channel is created. The expiration time may be defined by the service providers via an agent registry or by an end user. Typically, the expiration time will be set to exceed an expected duration of time required to send the compressed data packets.

Figure 8:
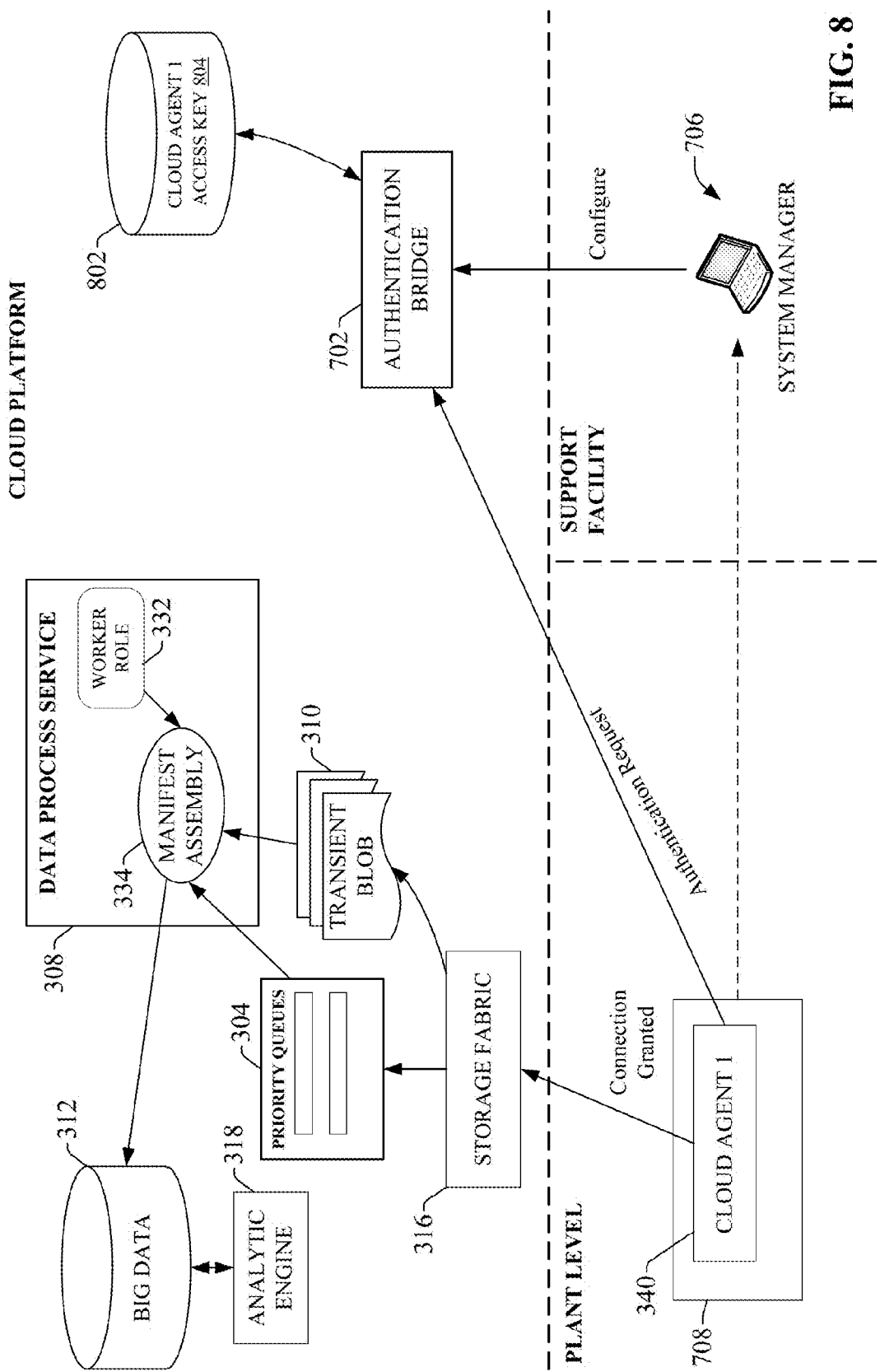
FIG. 8 is a block diagram of another example architecture that utilizes an authentication bridge to manage agent communication to a customer's cloud platform.

FIG. 8 is a block diagram of another example architecture that utilizes an authentication feature (e.g., security feature) to manage agent communication to a customer's cloud platform. In the embodiment shown in FIG. 8, an access key 804 for the Cloud Agent 1 (e.g., the cloud agent 340) can be stored in storage 802 on the cloud platform rather than on the computing device 708. The access key 804 can correspond to the access key 712 shown in FIG. 7. In one example, the storage 802 can also include the data 710. Accordingly, an access key can be regenerated for the cloud agent 340 in case of a security threat. Furthermore, restricted access to services provided by the cloud platform (e.g., a container, a blob, a table and/or a queue resource) can be delegated by specifying an interval for which resources are available and/or by specifying resource permissions for a client. Additionally, a shared access signature can grant operations to a client (e.g., a cloud agent) associated with the signature such as, but not limited to, use of MAC identifications unique to a transmitter, use of a subscription based registry to regenerate keys and/or leverage notifications to a manager upon security disruptions or threats, etc. Additionally, a shared access signature can reference a stored access policy that provides an additional level of control over a set of signatures, including an ability to modify and/or revoke access to a resource.

Figure 9:
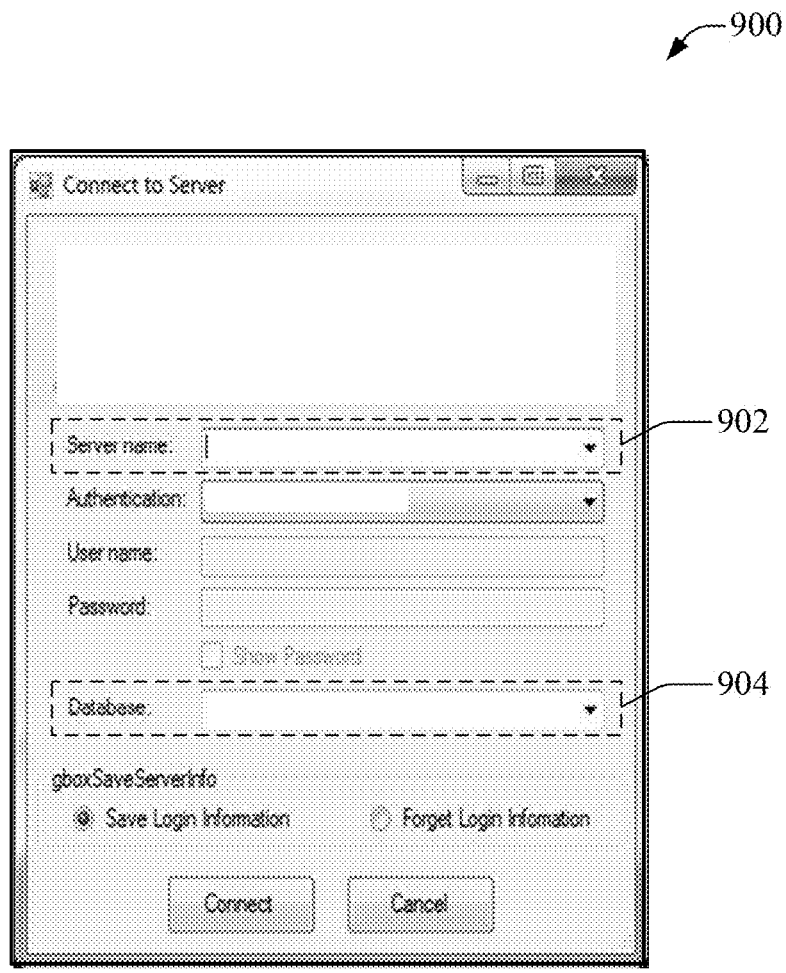
FIG. 9 illustrates an example user interface associated with a cloud platform.

FIG. 9 illustrates a user interface 900 that allows a user to connect to an authentication feature (e.g., cloud agent authentication 300, authentication bridge 702, etc.) of a cloud platform. The user interface 900 can be associated with a registration mode (e.g., cloud agent registration mode) associated with a cloud platform. In an aspect, a cloud platform (e.g., a cloud server platform) can be selected via a selection option 902. In another aspect, a database associated with a cloud platform (e.g., big data storage 312, storage 704, storage 802, etc.) can be selected via a selection option 904. In a non-limiting example, the user interface 900 can be a server connect that allows a system administrator to connect to an authentication feature and/or a database (e.g., a main database) associated with a cloud platform.

Figure 10:
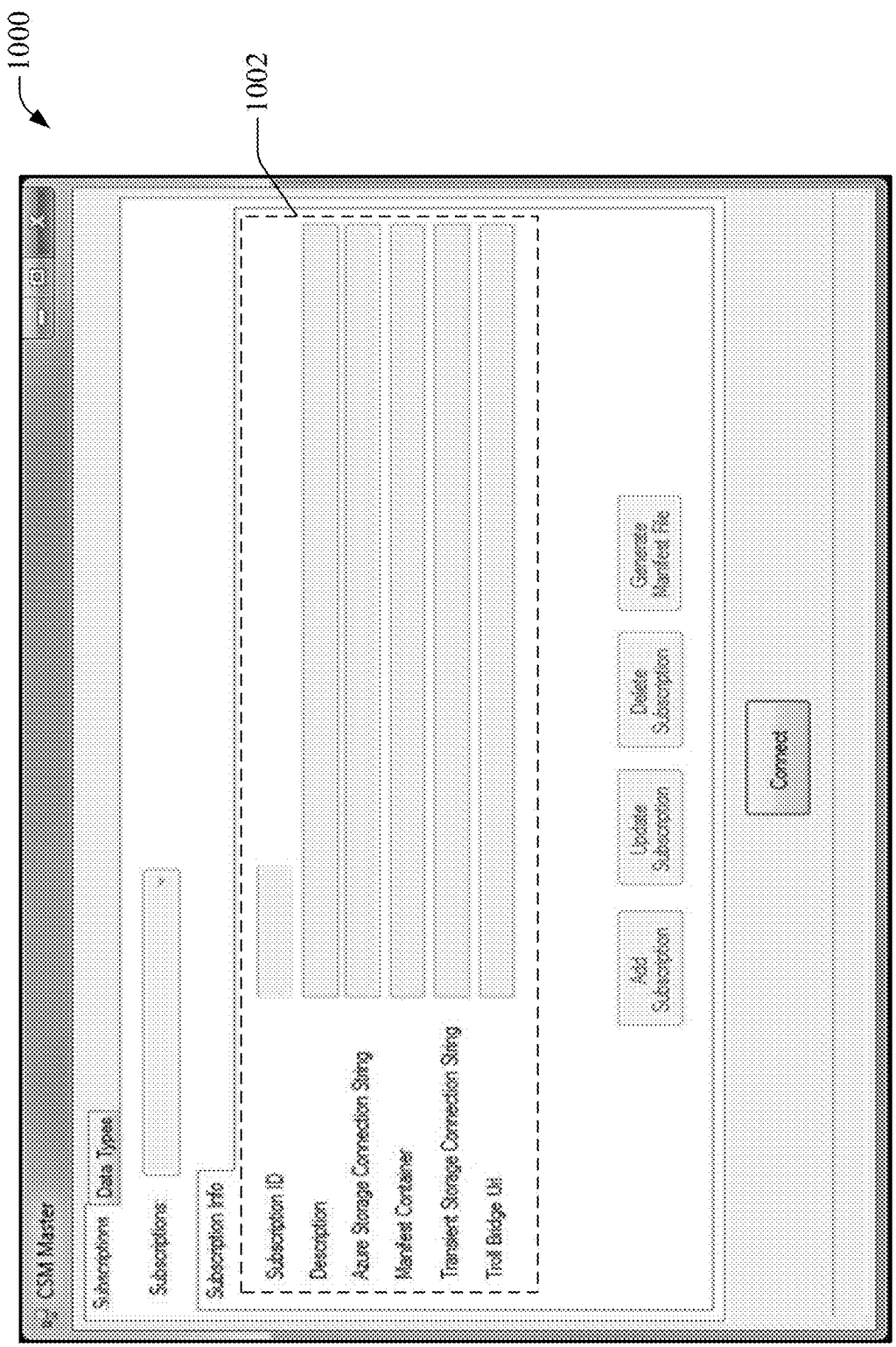
FIG. 10 illustrates another example user interface associated with a cloud platform.

FIG. 10 illustrates a user interface 1000 that allows a user to configure an authentication feature (e.g., cloud agent authentication 300, authentication bridge 702, etc.) of a cloud platform. The user interface 1000 can be associated with a registration mode (e.g., cloud agent registration mode) associated with a cloud platform. In an aspect, an access key for a cloud agent and/or information associated with an access key can be configured via a configuration option 1002. The configuration option 1002 can also allow a user (e.g., a system administrator) to specify access to storage associated with a cloud platform.

Figure 11:
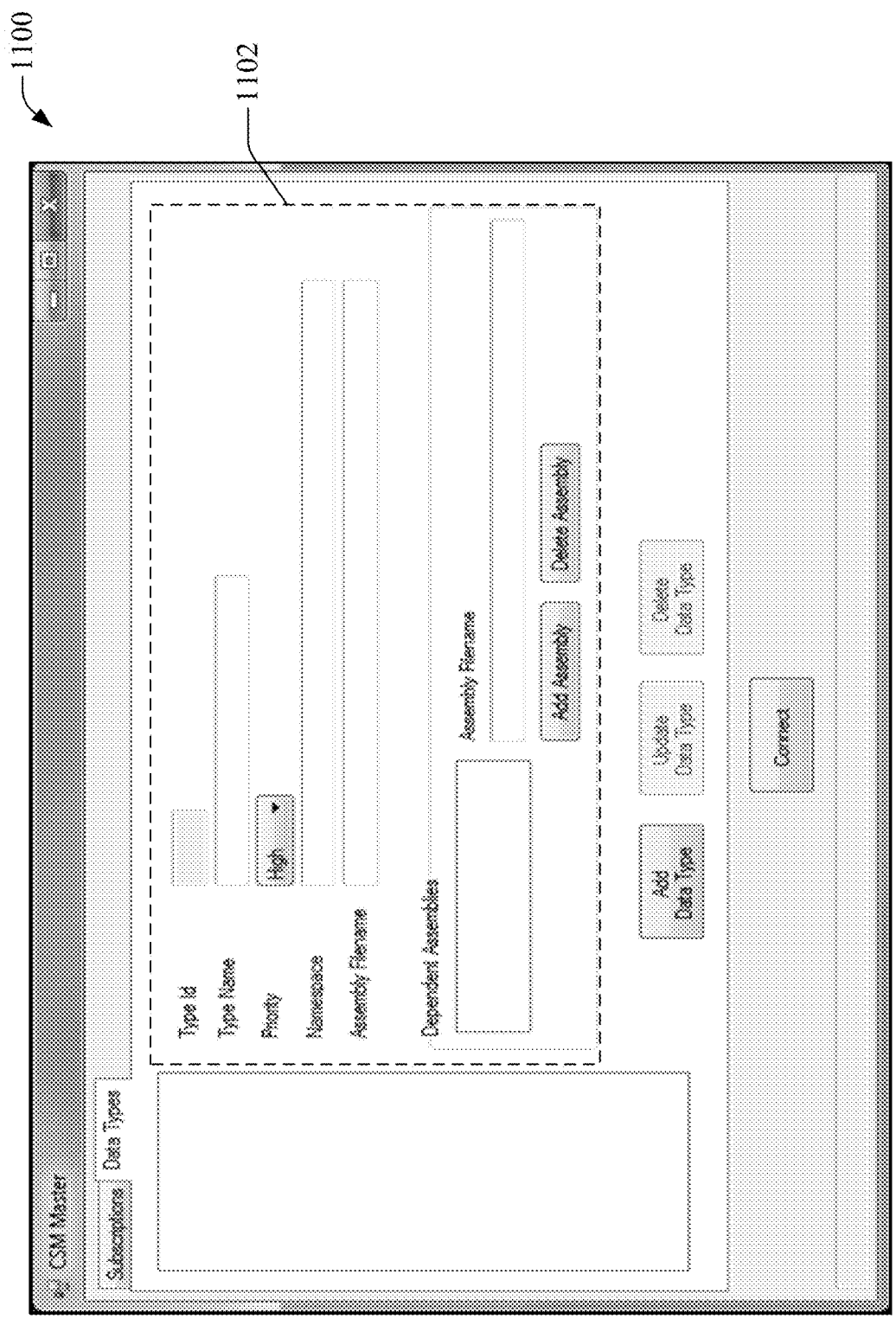
FIG. 11 illustrates yet another example user interface associated with a cloud platform.

FIG. 11 illustrates a user interface 1100 that also allows a user to configure an authentication feature (e.g., cloud agent authentication 300, authentication bridge 702, etc.) of a cloud platform. The user interface 1100 can be associated with a registration mode (e.g., cloud agent registration mode) associated with a cloud platform. A user (e.g., a system administrator) can specify priorities and/or data processing assemblies via a configuration option 1102. The data processing assemblies can be associated with a data event that is loaded by a worker role based on a manifest directive after receiving the data event from a cloud agent.

Figure 12:
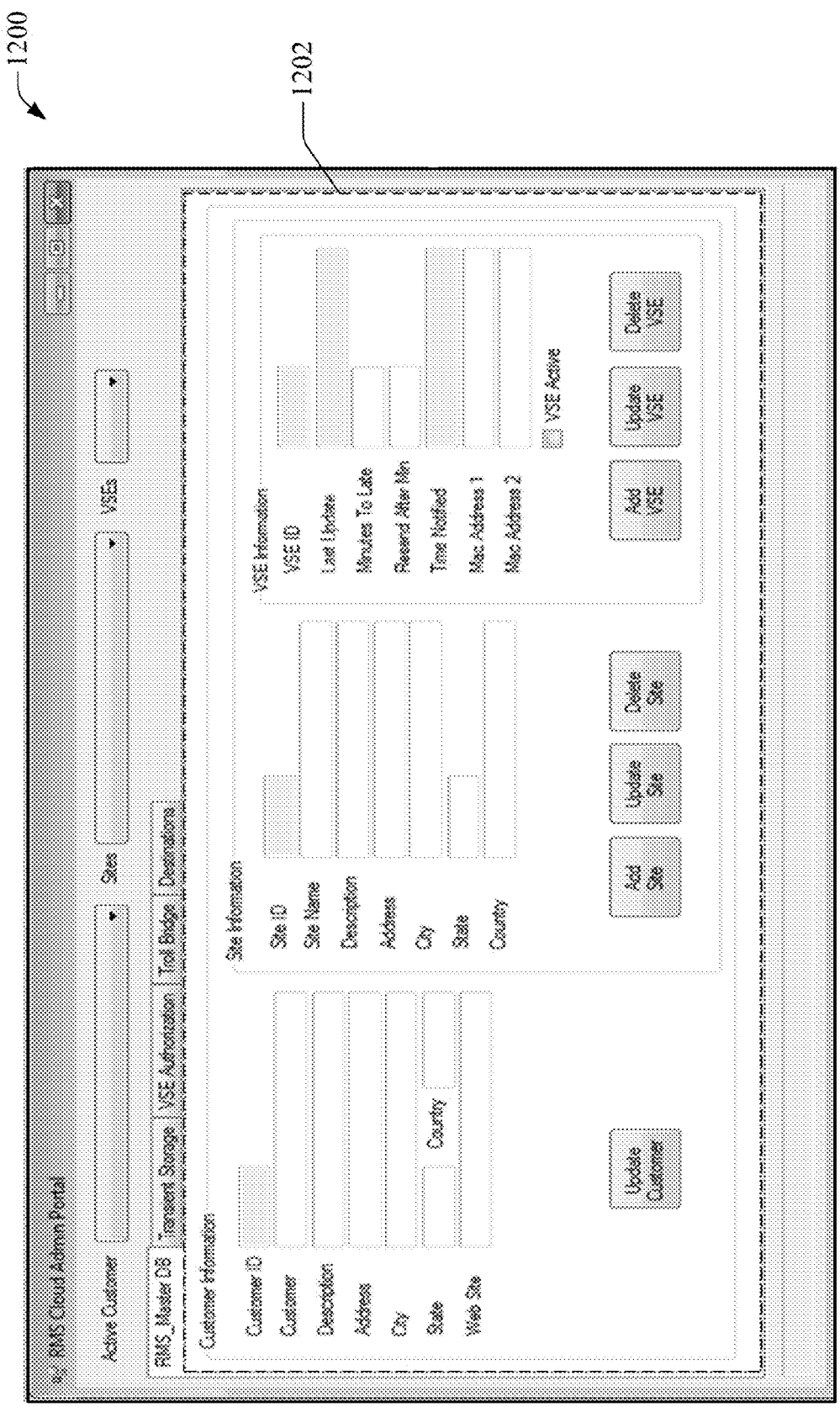
FIG. 12 illustrates yet another example user interface associated with a cloud platform.

FIG. 12 illustrates a user interface 1200 that also allows a user to configure metadata for a cloud agent. The user interface 1200 can be associated with a registration mode (e.g., cloud agent registration mode) associated with a cloud platform. A user (e.g., a system administrator) can specify metadata associated with a cloud agent via a configuration option 1202. In an aspect, metadata specified for cloud agent via the configuration option 1202 can be metadata associated with an access key generated for the cloud agent.

Figure 13:
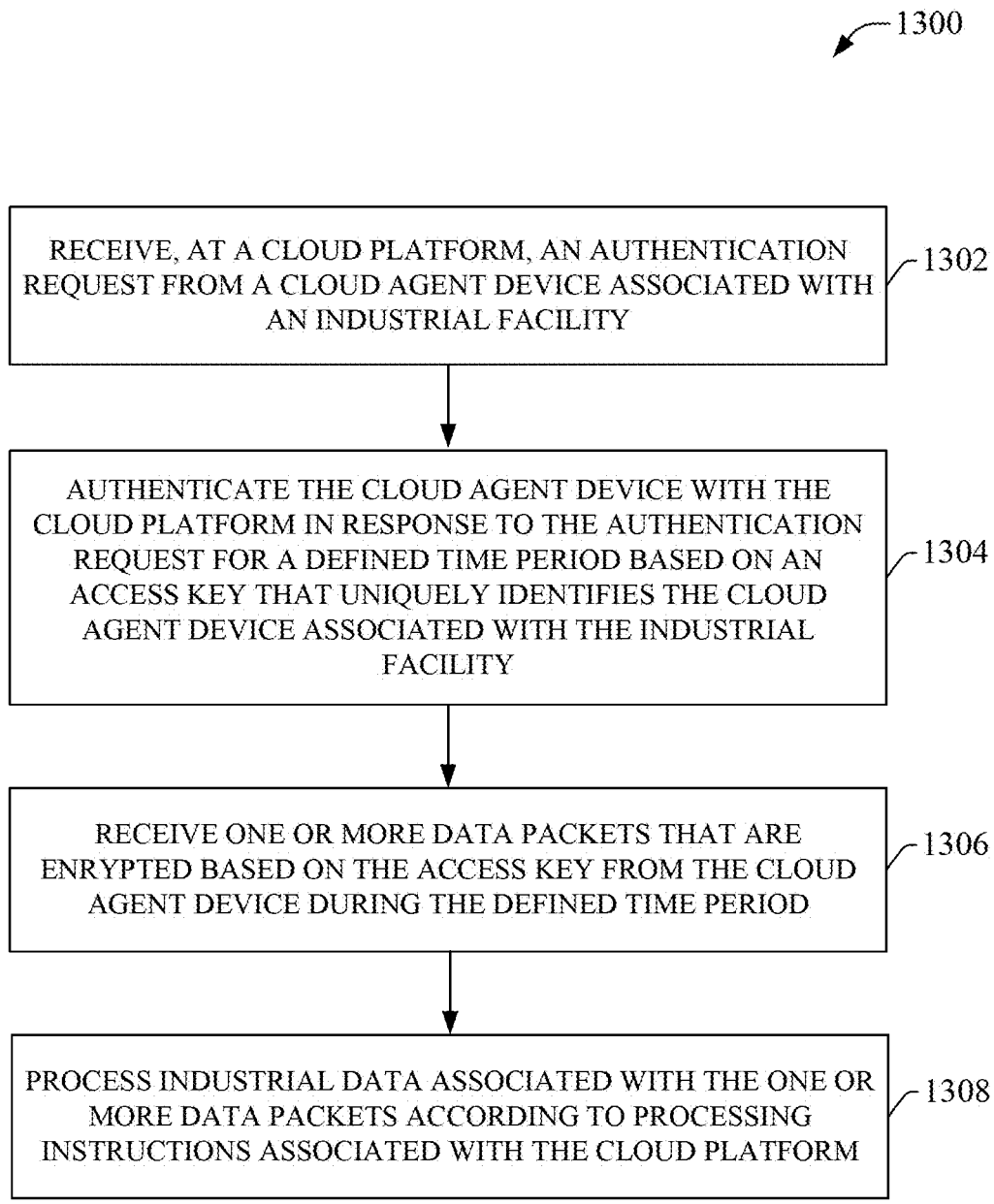
FIG. 13 is a flowchart of an example methodology for facilitating authorized communication between a cloud agent device and a cloud platform.
Figure 14:
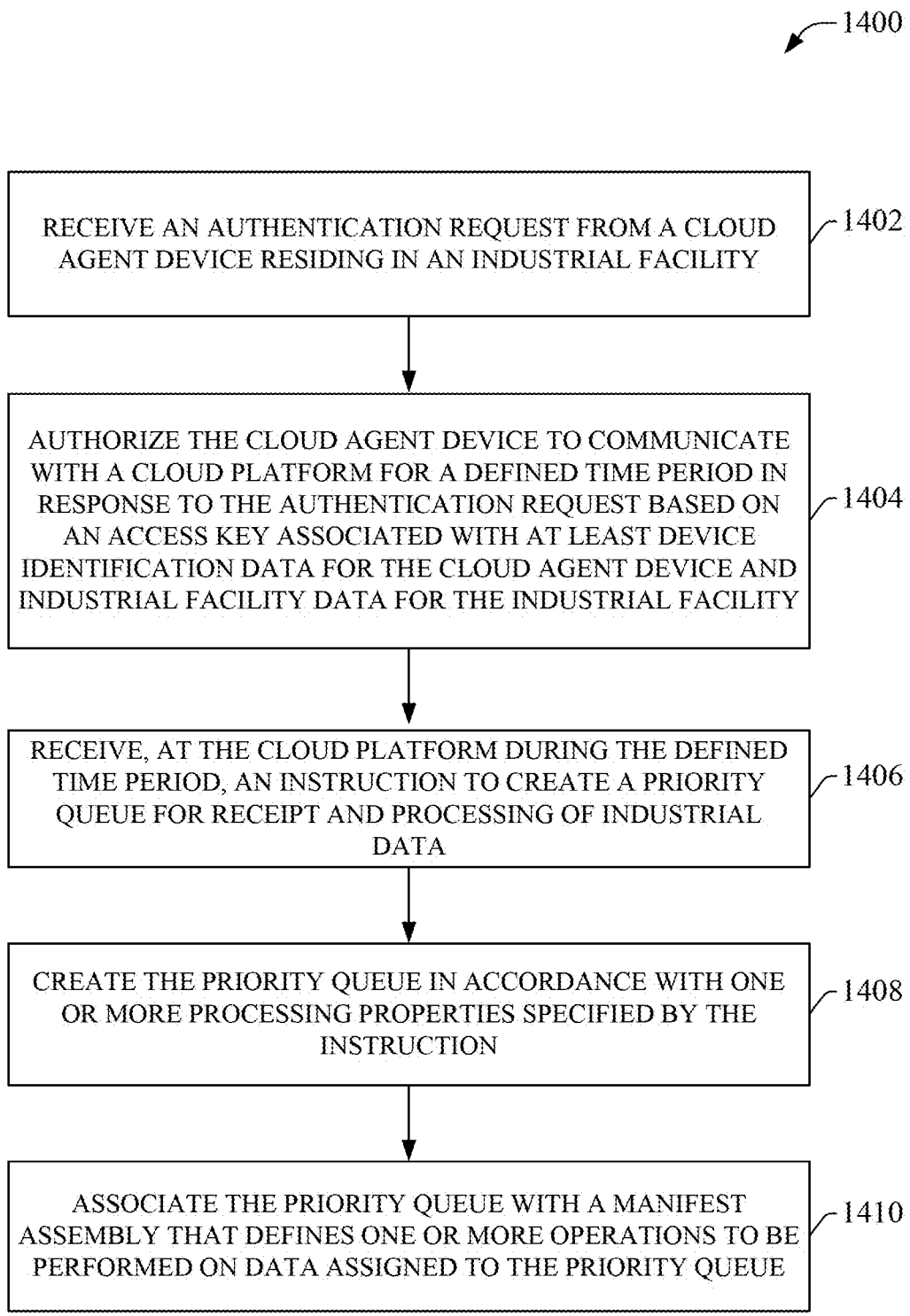
FIG. 14 is a flowchart of another example methodology for facilitating authorized communication between a cloud agent device and a cloud platform.
Figure 15:
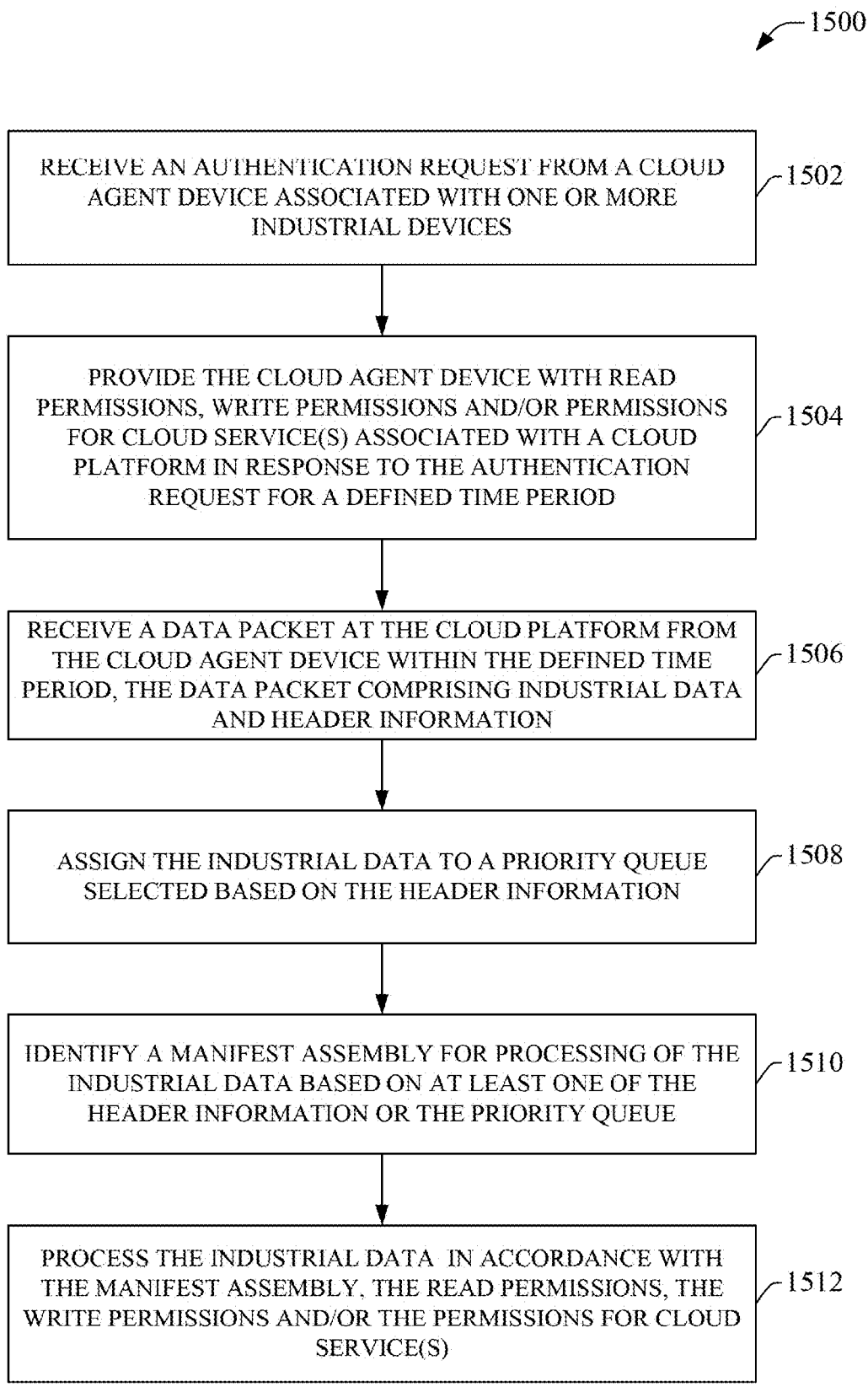
FIG. 15 is a flowchart of yet another example methodology for facilitating authorized communication between a cloud agent device and a cloud platform.

FIGS. 13-15 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13 illustrates an example methodology 1300 for facilitating authorized communication between a cloud agent device and a cloud platform. Initially, at 1302, an authentication request from a cloud agent device associated with an industrial facility is received at a cloud platform. The cloud agent device can be associated with one or more industrial devices. The authentication request can be a request to establish an authorized connection between the cloud agent device and the cloud platform.

At 1304, the cloud agent device is authenticated with the cloud platform in response to the authentication request for a defined time period based on an access key that uniquely identifies the cloud agent device associated with the industrial facility. For example, the cloud agent device can be authorized to communicate with the cloud platform in response to the authentication request for a defined time period based on an access key that uniquely identifies the cloud agent device associated with the industrial facility. The access key can be associated with metadata that uniquely identifies the cloud agent device associated with the industrial facility. The metadata can include device identification data associated with the cloud agent device and/or an industrial device related to the cloud agent device (e.g., a media access control (MAC) address, another type of identifier, etc.), industrial facility data associated with the industrial facility (e.g., a site identification, location data, etc.), and/or customer data associated with the cloud agent device and/or the industrial facility.

At 1306, one or more data packets that are encrypted based on the access key are received from the cloud agent device during the defined time period. For example, the cloud agent device can be authorized to transmit data packets to the cloud platform during the defined time period. In an aspect, the one or more data packets can include industrial data associated with the industrial facility (e.g., one or more industrial devices associated with the cloud agent device).

At 1308, industrial data associated with the one or more data packets is processed according to processing instructions associated with the cloud platform. For example, the industrial data can be processed based on read permissions for storage associated with the cloud platform, write permissions for storage associated with the cloud platform, and/or permissions associated with cloud services provided by the cloud platform.

FIG. 14 illustrates an example methodology 1400 for facilitating authorized communication between a cloud agent device and a cloud platform. Initially, at 1402, an authentication request is received from a cloud agent device residing in an industrial facility. At 1404, the cloud agent device is authorized to communicate with a cloud platform for a defined time period in response to the authentication request based on an access key associated with at least device identification data for the cloud agent device and industrial facility data for the industrial facility. For example, the identification data for the cloud agent device can include a MAC identification associated with the cloud agent device. The industrial facility data for the industrial facility can include a site identification and/or location data. Additionally, the access key can be associated with other information, such as but not limited to, customer data, other identification data, etc.

At 1406, an instruction is received, at a cloud platform during the defined time period, to create a priority queue for receipt and processing of industrial data. The instruction can be received, for example, from the cloud agent residing in the industrial facility, via a configuration dashboard or other type of user interface that allows a system administrator to configure priority queues for processing of respective different types of industrial data, or from other priority queue configuration means.

At 1408, the priority queue is created in the cloud platform in accordance with one or more processing properties specified by the instruction. The priority queue can be one of multiple priority queues defined for a specific customer entity in the cloud platform, where the priority queues define how data packets received from on-premise data collection systems residing at a customer facility are to be processed by cloud processing services executing in the cloud platform. Each priority queue can be associated with a different data type (e.g., live data, historical data, alarm data, etc.) or customer-specific application. For example, the instruction may define a data type to be assigned to the priority queue; an upload frequency associated with the priority queue; a priority level of the priority queue relative to other defined queues; an identity of a cloud partition, remote cloud, or database to which data in the queue is to be sent for storage; or other such information.

At 1410, the priority queue is associated with a manifest assembly that defines one or more operations to be performed on data assigned to the priority queue. The manifest assembly can reside in a manifest repository on the cloud platform, and defines one or more procedures to be executed on industrial data assigned to the queue (e.g., placement of the data in a particular storage location, calculation of one or more metrics based on the data, rendering of a data at a remote device, generation of a remote notification when the data satisfies a criterion, etc.). The manifest assembly can also identify ranges and thresholds to be used as parameters for the specified procedures, and data tags for mapping data assigned to the priority queue to corresponding variables of the procedures. Once the priority queue has been established, data packets received from on-premise data collection components at a plant facility can be placed in the priority queue based on a determination of that the data packet corresponds to the data type defined for the priority queue, and the data packet can be processed in accordance with the associated manifest assembly.

FIG. 15 illustrates an example methodology 1500 for facilitating authorized communication between a cloud agent device and a cloud platform. At 1502, an authentication request from a cloud agent device associated with one or more industrial devices is received. The one or more industrial devices can be associated with an industrial facility. At 1504, the cloud agent device is provided with read permissions, write permissions and/or permissions for cloud service(s) associated with a cloud platform in response to the authentication request for a defined time period. The cloud service(s) can include, but are not limited to, security (e.g., authentication) services, data storage, data analysis, control applications (e.g., applications that can generate and deliver control instructions to industrial devices based on analysis of real-time system data or other factors), visualization applications such as the cloud-based operator interface system described herein, reporting applications, Enterprise Resource Planning (ERP) applications, notification services, or other such applications. At 1506, a data packet is received at a cloud platform from the cloud agent within the defined time period. The data packet can comprise industrial data collected from the one or more industrial devices and header information. The header information can include data fields corresponding one or more of a customer identifier, a site identifier a device or virtual support engineer identifier, a processing priority of the industrial data contained in the packet, a message type of the data, a process identifier of a process to be performed on the data, or other such information.

At 1508, the industrial data contained in the data packet is assigned to a priority queue in the cloud platform, where the priority queue is selected from multiple available priority queues based on the header information. For example, the priority queue may correspond to the particular message type or process identifier specified in the header information. Accordingly, data processing services executing in the cloud platform can read the header information to determine the message type or process identifier, and assign the industrial data contained in the data packet to the appropriate queue based on this information. At 1510, a manifest assembly for processing of the industrial data is identified based on at least one of the header information or processing properties associated with the priority queue. For example, a customer's system manifest may be organized into multiple hierarchical levels that correspond to data fields of the header information, and a particular tag manifest and metrics manifest associated with the system manifest can be identified by navigating the hierarchical structure based on the data field values of the header information. At 1512, the industrial data is processed in accordance with the read permissions, the write permissions and/or the permissions for cloud service(s).

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
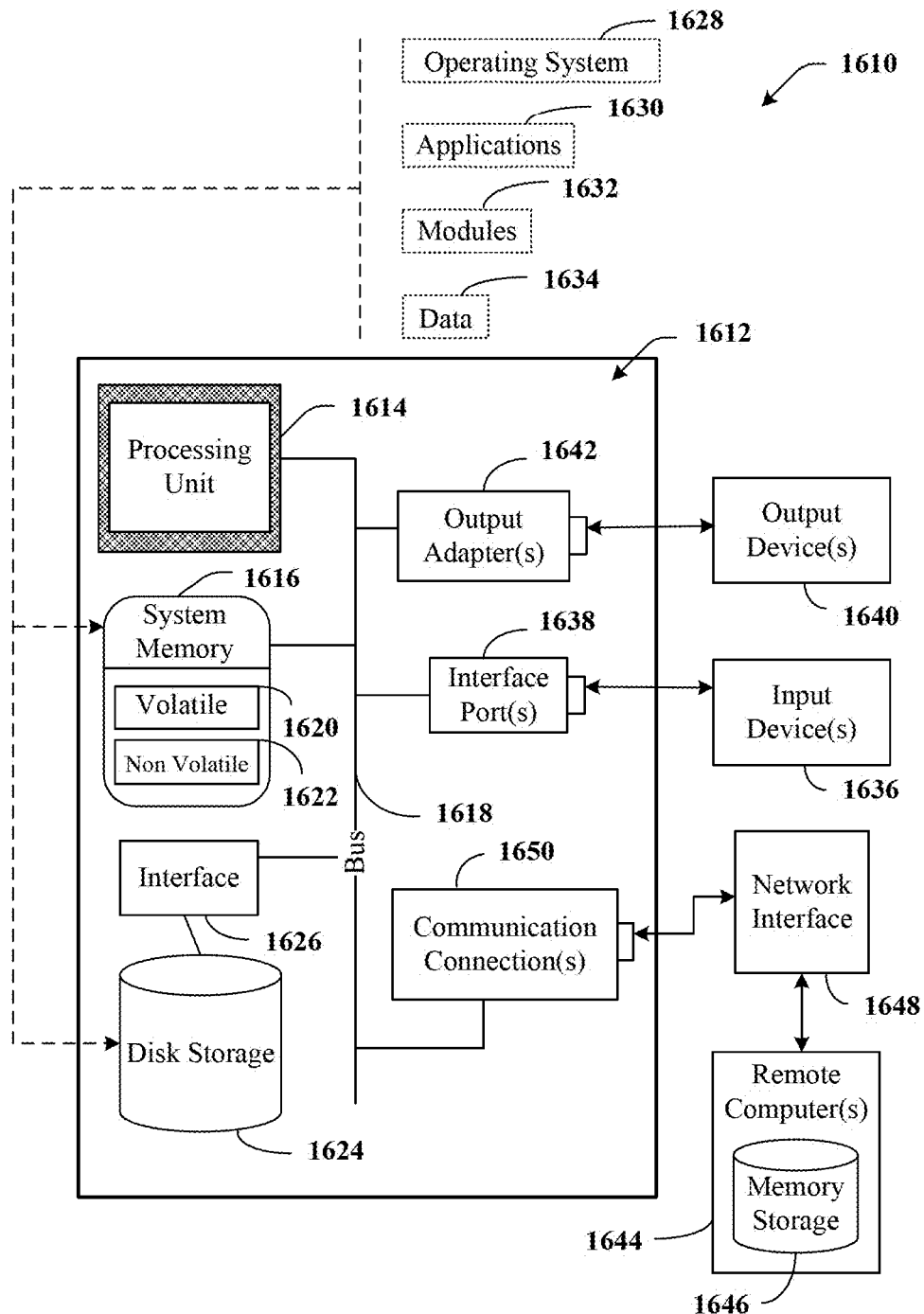
FIG. 16 is an example computing environment.
Figure 17:
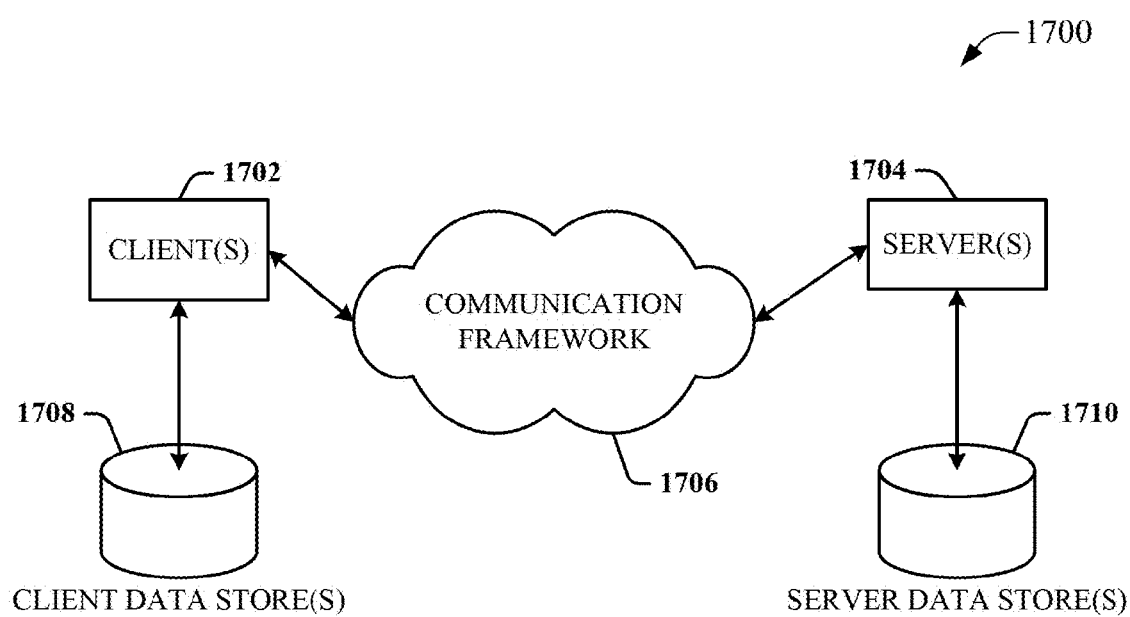
FIG. 17 is an example networking environment.

In order to provide a context for the various aspects of the disclosed subject matter, FIGS. 16 and 17 as well as the following discussion are intended to provide a brief, general description of a suitable environment in which the various aspects of the disclosed subject matter may be implemented. With reference to FIG. 16, an example environment 1610 for implementing various aspects of the aforementioned subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Multi-core microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer 1612. System applications 1630 take advantage of the management of resources by operating system 1628 through program modules 1632 and program data 1634 stored either in system memory 1616 or on disk storage 1624. It is to be appreciated that one or more embodiments of the subject disclosure can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapters 1642 are provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the system bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample computing environment 1700 with which the disclosed subject matter can interact. The sample computing environment 1700 includes one or more client(s) 1702. The client(s) 1702 can be hardware and/or software (e.g., threads, processes, computing devices). The sample computing environment 1700 also includes one or more server(s) 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The sample computing environment 1700 includes a communication framework 1706 that can be employed to facilitate communications between the client(s) 1702 and the server(s) 1704. The client(s) 1702 are operably connected to one or more client data store(s) 1708 that can be employed to store information local to the client(s) 1702. Similarly, the server(s) 1704 are operably connected to one or more server data store(s) 1710 that can be employed to store information local to the servers 1704.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores computer-executable components;
a processor, operatively coupled to the memory, that executes the computer-executable components, the computer-executable components comprising:
an authentication component configured to:
receive, over a wide area network, an authentication request from a cloud agent device operating on a local area network in communication with a plurality of industrial devices associated with an industrial process in a facility;
in response to the authentication request, generate an access key that authenticates the cloud agent device with a cloud platform for a defined period of time, wherein the access key uniquely identifies the cloud agent device for the facility; and
transmit the access key to the cloud agent device; and a cloud data processing component configured to:
receive, at the cloud platform, one or more data packets from the cloud agent device during the defined period of time;
assign respective industrial data contained in the one or more data packets to priority queues in the cloud platform based on respective header data included with the one or more data packets, wherein the respective priority queues have different priority levels for data processing;
select a manifest assembly from a set of manifest assemblies based on header data associated with a data packet of the one or more data packets; and
process industrial data from the data packet in a priority queue to which the industrial data has been assigned in accordance with the manifest assembly.

2. The system of claim 1, wherein the authentication component authorizes the cloud agent device to utilize one or more cloud services associated with the cloud platform based on metadata associated with the one or more data packets.

3. The system of claim 1, wherein the authentication component pre-registers the cloud agent device with the cloud platform during a registration mode based on user input.

4. The system of claim 1, wherein the authentication component is implemented on the cloud platform.

5. The system of claim 1, wherein the authentication component selects the access key based on device identification data associated with the cloud agent device and facility data associated with the facility.

6. The system of claim 5, wherein the authentication component determines an authentication policy for the cloud agent device based on the device identification data and the facility data.

7. The system of claim 1, wherein respective priority queues are associated with distinct types of data of the industrial data.

8. The system of claim 7, wherein the cloud data processing component comprises a manifest assembly repository configured to maintain the set of manifest assemblies that respectively define operations to be performed on the industrial data.

9. The system of claim 8, wherein the cloud data processing component is further configured to receive an additional data packet from the from the cloud agent device during the defined period of time, wherein the additional data packet comprises a new manifest assembly, and to process the add the new manifest assembly to the manifest assembly repository.

10. A method, comprising:
receiving over a wide area network, by a system comprising at least one processor, an authentication request from a cloud agent device operating on a local area network in communication with a plurality of industrial devices associated with an industrial process in a facility;
in response to the authentication request, generating, by the system, an access key that authenticates the cloud agent device with a cloud platform for a defined interval of time, wherein the access key uniquely identifies the cloud agent device for the facility;
transmitting, by the system, the access key to the cloud agent device;
receiving, by the system, a data packet comprising industrial data from the cloud agent device during the defined interval of time;

assigning, by the system, the industrial data to a priority queue of a plurality of priority queues on the cloud platform, wherein the priority queue is selected based on header data included with the data packet, and respective priority queues of the plurality of priority queues have different priority levels for data processing;

selecting, by the system, a manifest assembly from a set of manifest assemblies based on the header data; and processing, by the system, the industrial data from the data packet in the priority queue in accordance with the manifest assembly.

11. The method of claim 10, further comprising authorizing, by the system, the cloud agent device to utilize one or more cloud services associated with the cloud platform based on the metadata associated with the data packet.

12. The method of claim 10, further comprising pre-registering, by the system, the cloud agent device with the cloud platform during a registration mode based on user input.

13. The method of claim 10, further comprising generating, by the system, a different access key for the cloud agent device after the defined time interval.

14. The method of claim 10, further comprising:
receiving, by the system, an additional data packet from the from the cloud agent device during the defined period of time, wherein the additional data packet comprises a new manifest assembly; and
adding, by the system, the new manifest assembly to a manifest assembly repository comprising the set of manifest assemblies.

15. The method of claim 10, wherein respective priority queues are associated with distinct types of industrial data.

16. The method of claim 10, further comprising selecting, by the system, the access key based on device identification data associated with the cloud agent device and facility data associated with the facility.

17. The method of claim 16, further comprising determining, by the system, an authentication policy for the cloud agent device based on the device identification data and the facility data.

18. A non-transitory computer-readable medium having stored thereon instructions that, in response to execution, cause a system comprising a processor to perform operations, the operations comprising:

receiving, over a wide area network at a cloud platform, an authentication request from a cloud agent device operating on a local area network in communication with a plurality of industrial devices associated with an industrial process in a facility, wherein the authentication request requests authentication of the cloud agent device with the cloud platform;

in response to the authentication request, generating, by the system, an access key that authenticates the cloud agent device with a cloud platform for a defined time period, wherein the access key uniquely identifies the cloud agent device with the facility;

transmitting the access key to the cloud agent device;

receiving one or more data packets from the cloud agent device during the defined time period;

assigning respective industrial data contained in the one or more data packets to priority queues in the cloud platform based on respective header data included with the one or more data packets, wherein the respective priority queues have different priority levels for data processing;

selecting a manifest assembly from a set of manifest assemblies based on header data associated with a data packet of the one or more data packets; and processing, by the system, industrial data from the data packet in a priority queue to which the industrial data has been assigned in accordance with the manifest assembly.

19. The non-transitory computer-readable medium of claim 18, wherein the operations further comprise authorizing the cloud agent device to utilize one or more cloud services associated with the cloud platform based on the metadata.

20. The non-transitory computer-readable medium of claim 18, wherein the operations further comprise selecting the access key based on device identification data associated with the cloud agent device and facility data associated with the facility.

* * * * *